US009322988B2

(12) United States Patent
Digiovanni et al.

(10) Patent No.: US 9,322,988 B2
(45) Date of Patent: Apr. 26, 2016

(54) BARBELL OPTICAL FIBER AND METHOD OF MAKING THE SAME

(71) Applicants: OFS Fitel, LLC, Norcross, GA (US); Raytheon Company, Waltham, MA (US)

(72) Inventors: David J Digiovanni, Mountain Lakes, NJ (US); Dennis J Trevor, Clinton, NJ (US); David A Rockwell, Culver City, CA (US); Vladimir V Shkunov, Torrance, CA (US)

(73) Assignee: OFS FITEL, LLC, Norcross, GA (US)

( * ) Notice: Subject to any disclaimer, the term of this patent is extended or adjusted under 35 U.S.C. 154(b) by 0 days.

(21) Appl. No.: 14/395,698

(22) PCT Filed: May 13, 2013

(86) PCT No.: PCT/US2013/040759
§ 371 (c)(1),
(2) Date: Oct. 20, 2014

(87) PCT Pub. No.: WO2013/170254
PCT Pub. Date: Nov. 14, 2013

(65) Prior Publication Data
US 2015/0110452 A1    Apr. 23, 2015

Related U.S. Application Data

(60) Provisional application No. 61/646,208, filed on May 11, 2012.

(51) Int. Cl.
*G02B 6/28* (2006.01)
*G02B 6/028* (2006.01)
*C03B 37/012* (2006.01)
*C03B 37/016* (2006.01)
*C03B 37/018* (2006.01)
*H01S 3/067* (2006.01)
*H01S 3/08* (2006.01)
*H01S 3/16* (2006.01)

(52) U.S. Cl.
CPC .............. *G02B 6/028* (2013.01); *C03B 37/016* (2013.01); *C03B 37/018* (2013.01); *C03B 37/01268* (2013.01); *C03B 37/01297* (2013.01); *H01S 3/06729* (2013.01); *C03B 2201/06* (2013.01); *C03B 2203/12* (2013.01); *C03B 2203/22* (2013.01); *H01S 3/0672* (2013.01); *H01S 3/06737* (2013.01); *H01S 3/08045* (2013.01); *H01S 3/1618* (2013.01); *H01S 3/1698* (2013.01)

(58) Field of Classification Search
USPC .......................................... 385/124
See application file for complete search history.

(56) References Cited

U.S. PATENT DOCUMENTS

| 8,588,267 | B1 * | 11/2013 | Panak | G02B 6/425 372/6 |
| 2007/0189685 | A1 * | 8/2007 | Choi | H01J 9/02 385/123 |
| 2010/0278503 | A1 * | 11/2010 | Nakai | C03C 25/105 385/142 |

*Primary Examiner* — Eric Wong
(74) *Attorney, Agent, or Firm* — Wendy W. Kobe, Esq.

(57) ABSTRACT

High aspect ratio core optical fiber designs, which could be semi-guiding, including a core region having a first refractive index and a high aspect ratio elongated cross-section along a slow axis direction, are described. An internal cladding having a second refractive index sandwiches the core and acts as a fast-axis signal cladding. The core has an edge region at both of its short edges that is in contract with edge-cladding regions having a barbell shape. The refractive index of the core regions, the refractive index of the internal claddings, and the refractive index of the edge-cladding regions, are selected so as to maximize the optical power of a lowest-order mode propagating in the fiber core, and to minimize the optical power of the next-order modes in the fiber core. A process to fabricate such a high aspect ratio core fiber is also provided.

67 Claims, 10 Drawing Sheets

$n_{MIM} \approx n_p \approx n_a > n_{sc}$
$n_{sc} \quad n_b$
$n_{oc} < n_b$ and $n_{MIM}$

REPLACEMENT SHEET

BARBELL OPTICAL FIBER AND METHOD OF MAKING THE SAME

CROSS-REFERENCE TO RELATED APPLICATIONS

This application claims the benefit of U.S. Provisional Application No. 61/646,208, filed May 11, 2012 and herein incorporated by reference.

BACKGROUND

Field of the Invention

Embodiments of the invention pertain to high aspect ratio core (HARC) fibers and semi-guiding high aspect ratio core (SHARC) fibers. More specifically, one or more embodiments relate to improved HARC and SHARC fiber architectures and methods for fabricating HARC and SHARC fibers. For ease of description, fibers that can be either HARC or SHARC will be referred to as (S)HARC fibers.

Rectangular-core fibers are commonly used for multiple applications, but there are limitations that make them unsuitable for a variety of advanced applications. First, rectangular-core fibers are limited in availability to only relatively low core aspect ratio configurations (the aspect ratio being defined as the width of the rectangular core relative to its height). In particular, these fibers are generally limited to core aspect ratios in the range of 3:1 to 10:1, thus precluding a realization of a number of performance benefits that may only be exploited if core aspect ratios in the range of 20:1 to 100:1 (or greater) can be fabricated. Second, in many cases, the rectangular cores of these fibers are embedded within a cladding that has a circular cross-section. For larger core dimensions, such circularly clad fibers are too thick to bend or coil, also limiting the range of applications. Third, the maximum absolute size of the cores is limited to the range of 100 to 200 μm by constraints that are inherent in conventional optical fiber fabrication processes, and there are applications that may require mm-scale core sizes.

Other than the shape, rectangular core fibers are physically similar to conventional circular-core fibers, both in materials and in fabrication. Applications for conventional rectangular-core fibers generally involve transmission of highly-multi-mode light and have not required much attention with respect to controlling the uniformity of the refractive index within the core or cladding, nor has there been a need to precisely control the shape of the core.

SHARC fiber structures are described in U.S. Pat. No. 7,983,312 and U.S. Publication No. US2010/0189401, each of which is incorporated by reference in its entirety. SHARC fibers can potentially scale to average powers well over 10 kW for broadband signals and >3 kW for narrowband (<10 kHz) signals, as well as peak powers of approximately 10 MW or more in pulsed operations. The SHARC fiber concept (shown schematically in FIG. 1) departs from conventional fiber designs by specifying a high-aspect ratio rectangular core with conventional index-based guiding via total internal reflection (TIR) only along the fast-axis direction, between the two large surfaces of the rectangular core. In the wide, slow-axis direction, the narrow core edges are designed not to support TIR; in fact, the index step at the narrow core-edge boundary is kept very small (Δn~100 ppm or less), such that all modes suffer propagation losses as they radiate out beyond the narrow core edges. Rather than relying on conventional waveguide-based mode discrimination, which is ineffective for large core areas, the SHARC fiber architecture exploits beam clean-up via "loss filtering," whereby higher-order modes naturally diffract more strongly out of the semi-guiding core region than the desired lowest-order mode. This loss filtering discrimination mechanism can be further enhanced by also exploiting gain filtering, whereby the gain profile is spatially shaped to provide the highest spatial overlap with the lowest-order slow-axis mode, such that the lowest-order mode is preferentially amplified to ensure single-mode operation.

FIG. 1 shows a schematic diagram of a SHARC fiber 16 wound in a spiral coil around a carrier 17, and a schematic cross-section 11 of the SHARC fiber 16 of the type described in U.S. Pat. No. 7,983,312. The "ribbon-like" geometry allows the fiber to be wound in a spiral coil on a cooled carrier 17 or other mechanical element. The cross-section 11 illustrates an active core 12 sandwiched between fast-axis claddings 15, and passive cores 13 between the claddings 15 at both sides of the active core 12, wherein the outside edges 14 of the passive cores have no index-based guiding, and with the cladding surrounding the core and the fast-axis cladding. The directions of the fast axis and slow axis are illustrated adjacent to the cross section.

FIG. 2 shows a schematic cross section of a SHARC fiber of the type described in U.S. Pat. No. 7,983,312. The SHARC fiber includes a high aspect-ratio core of width $w_o$, which, in this case, contains an active core 21 and a passive core 22 and has a height (or thickness) $h_o$, with a top wide interface, a bottom wide interface, and two narrow edge interfaces. The core is shown divided into three adjacent regions: an active core region 21 of width $w_a$ and refractive index $n_a$ that is doped with a laser-active ion, and passive core regions 22 on either edge of the active core region having a refractive index $n_p$. This division is optional, and is shown here to represent the most general case. In practice, the active core region 21 could be as much as 100% of the full core width, or $w_a = w_o$; the relative width of the active region is a design parameter that can be specified to optimize mode discrimination and/or mode-index matching.

An inner cladding 25 of height h and width w surrounds the core. The inner cladding comprises two signal claddings 23, lying above and below the core, and two edge sections, to the right and left of the core. The laser gain medium is configured as a thin glass foil. This foil has an embedded planar core with planar signal claddings, and a mode-index matching (MIM) material along the core edges. The MIM material has a refractive index such that the core is optically "open" (i.e., there are essentially no reflections) at the core-MIM material interface, allowing the amplified signal to overfill the active portion of the core in the slow-axis direction.

The inner cladding 25 is surrounded by an outer cladding 26, typically a polymer, having a refractive index $n_{oc}$. The fiber may also include optional ballast regions 24, having a refractive index $n_b$, above and below the signal claddings, lying between the signal cladding 23 and the outer cladding 26.

Total internal reflection (TIR) is used to trap light in the core in the fast-axis direction. The signal claddings 23 have an index of refraction $n_{sc}$ that is smaller than the indices of refractive $n_a \approx n_p$ of the core 21, such that light in the core is trapped by TIR at the top and bottom interfaces. The numerical aperture (NA) and the thickness $h_o$ of the core can be specified either to make the core single-mode in the fast-axis direction, or to make it accommodate a few modes, analogous to a conventional large mode area (LMA) fiber. In the latter case, the core guides a few fast-axis modes, and the SHARC fiber is wound around a cylinder (as shown in FIG. 1) at a prescribed coil radius to remove the higher-order modes.

Fabricating a SHARC fiber of the type shown in FIG. 2 in a multi-layer core-cladding configuration may create challenges. Accordingly, improved (S)HARC fiber designs and improved methods and processes for fabricating (S)HARC fibers are desired.

SUMMARY OF THE INVENTION

Embodiments of the present invention include a method of making a high aspect ratio core optical fiber preform, comprising the steps of forming a near-net rectangular-shaped core region of a first composition and having an elongated cross-section with a wide slow-axis dimension and a narrow fast-axis direction, forming a pair of near-net shape cladding elements having a second composition, disposing the pair of near-net shape cladding elements adjacent to each slow-axis edge of the core region to form a pair of edge-cladding regions (the combination exhibiting a barbell configuration) and surrounding the combination of the near-net rectangular shape core region and the pair of near-net shape cladding elements with an outer cladding of a third composition.

Other embodiments include the following features: at least one of the near-net shape cladding elements is a rod that is substantially circular in cross-section, or a group of rods of substantially circular cross-section. The edge-cladding region may be equal to or greater than the height of the core region in size.

Another embodiment of the present invention depicts a process for fabricating a preform for a barbell optical fiber, comprising the steps of providing an outer mold, inserting an inner mold within an opening in the outer mold, the inner mold exhibiting a barbell configuration including a near-net rectangular shape having an elongated cross-section with a wide slow-axis dimension and a narrow fast-axis direction with a pair of near-net shapes adjacent to each slow-axis edge of the near-net rectangular shape, placing cladding material of a first composition in open areas between the outer mold and the inner mold, removing the inner mold, inserting a near-net rectangular shape core region of a second composition, and having an elongated cross-section with a wide slow axis dimension and a narrow fast axis direction, in the opening created by removing the inner mold and inserting a pair of near-net shape elements having a third composition at opposing end terminations of the slow-axis edges of the near-net rectangular shape core region, forming a pair of edge-cladding regions.

Further, the process of these or other embodiments may comprise the step of drawing the preform into an optical fiber.

Further, the first and the third compositions may be the same or different. One or more of the near-net shapes may be formed by one or more of the following methods: sol-gel processing, outside vapor deposition (OVD), inside vapor deposition (IVD), vapor axial deposition (VAD), planar soot deposition (PSD), and combinations thereof. Further, the composition of one or more of the near-net shapes may be achieved through a doping process comprising one or more of sol-gel doping, molecular stuffing, solution doping and vapor doping.

Other aspects of this embodiment include the second near-net shape being substantially rectangular in shape with rounded edges, and the first near-net shape having a first refractive index when in a fiber state, and the second near-net shape having a second refractive index less than the first refractive index.

Another embodiment of the present invention includes a high aspect ratio core optical fiber exhibiting a barbell configuration comprising a near-net rectangular shape core region of a first composition, the core region having an elongated cross-section with a wide slow-axis dimension and a narrow fast-axis direction, a pair of near-net shape cladding regions having a second composition, the pair of near-net shape cladding regions disposed adjacent to each slow-axis edge of the core so as to contact the edges of the core region, the combination exhibiting a barbell configuration and an outer cladding of a third composition disposed to surround the barbell configuration, the third composition being different from the first composition.

Yet another embodiment of the present invention describes a barbell-structure optical fiber, comprising a high aspect ratio core region having an elongated cross-section with a wide slow-axis dimension and a narrow fast-axis dimension, wherein a core region has a substantially rectangular shape in cross-section, including a width and a height that defines an aspect ratio of width to height and a first refractive index, an inner cladding region positioned in contact with and sandwiching the core region, the inner cladding having a second refractive index lower than the first refractive index, an outer cladding region arranged to surround the inner cladding and core region, the outer cladding region having a third refractive index lower than the second refractive index, and a first edge-cladding region and a second edge-cladding region, the first edge-cladding region positioned adjacent to a first slow-axis edge region of the core region, the second edge-cladding region positioned adjacent to a second slow-axis edge region of the core region. Aspects of this embodiment include the aspect ratio being at least 10:1 or greater. Alternately, the refractive index of the first and second edge-cladding regions can substantially match the refractive index of the inner cladding region, or fall between the indices of the core region and inner cladding region. Further, the core fast-axis dimension and numerical aperture (NA) may be selected such that the core supports only a single transverse mode or multiple modes in the fast-axis direction.

According to another embodiment, the inventive fiber has a delta NA value of at least 0.45 between second and third refractive indices and further, the edge-cladding region comprises a rod or a plurality of rods, which may be substantially circular in cross-section. Aspects of this embodiment include the rod or one or more of the plurality of rods having a diameter that is equal to or greater than the height of the core region. Further aspects include an axis of the rod or one or more of the plurality of rods being displaced with respect to a middle plane of the core and the rod or one or more of the plurality of rods being doped with a material that is absorbing for an optical signal.

Embodiments may include the length of the fiber being less than a transient length at which the light leakage from the core to the edge-cladding regions accumulates to a level sufficient for noticeable leakage back into the core region, the core having a cross-sectional shape functioning as a graded index (GRIN) lens in the slow-axis direction. Further, the core first refractive index may have a spatial profile in the slow-axis direction with a maximum value at the core center and a minimum value at the slow-axis edges such that the core functions as a positive graded index (GRIN) lens in the slow-axis direction. Alternately, the minimum value may be at the core center and the maximum value at the slow-axis edges, allowing for the core to function as a negative graded index (GRIN) lens in the slow-axis direction.

Aspects of embodiments of the present invention include doping the core with an active laser ion that provides gain at a first optical wavelength. Further, the active laser ion concentration can have a spatial profile in the slow-axis direction with a maximum concentration at the core center and substantially lower concentration at the first and second slow-axis core edges. Alternately, the laser ion concentration may be substantially zero at the first and second slow-axis core edges. Additionally, the edge-cladding regions may be doped with an ion that is absorptive at the first optical wavelength. An example of this includes the active ion being Yb and the absorber doped into the edge-cladding regions is Sm or Dy.

Yet another embodiment of the present invention includes a barbell-structure optical fiber, comprising a high aspect ratio core region having an elongated cross-section with a wide slow-axis dimension and a narrow fast-axis dimension, wherein the core region has a substantially rectangular shape in cross-section including a width and a height defining an aspect ratio of width to height, optionally, the aspect ratio at least 10:1, and the core region having a first refractive index, an inner cladding region positioned sandwiching the core region, the inner cladding having a second refractive index lower than the first refractive index, and a first edge-cladding region and a second edge-cladding region, the first edge-cladding region positioned adjacent to a first slow-axis edge region of the core region, and the second edge-cladding region positioned adjacent to a second slow-axis edge region of the core region.

Aspects of this embodiment include the first and second edge-cladding regions have a refractive index that substantially matches the refractive index of the core slow-axis edge regions so that any optical power from undesired higher-order slow-axis modes of the planar core leak away from the core while the power in the lowest-order mode suffers negligible leakage loss. Alternately, the first and second edge-cladding regions can have a refractive index that provides either guiding or anti-guiding at the slow-axis edges of the core.

Further aspects include an outer cladding region arranged to surround the inner cladding, the outer cladding region having a third refractive index lower than the second refractive index. Optionally, the difference between second and third refractive indices provides a NA of at least 0.45. The core may have a fast-axis dimension and NA to support either only a single transverse mode or multiple modes in the fast-axis direction. Additionally, the length of the fiber can be less than a transient length at which the light leakage from the core to the edge-cladding regions accumulates to a level sufficient for noticeable leakage back into the core region.

Additional aspects include the edge-cladding region comprising a rod, and further, the refractive index of the rod can differ from the refractive index of the core by less than 100 ppm and can be substantially circular in cross-section. Further, the rod can have a diameter that is equal to or greater than the height of the core region, wherein an axis of the rod is displaced with respect to a middle plane of the core. Alternately, the edge-cladding region may comprise a plurality of rods. The rod or rods may be doped with a material that is absorbing for an optical signal.

Further aspects include the core having a cross-sectional shape functioning as a graded index (GRIN) lens in the slow-axis direction. Alternately, the core first refractive index can have a spatial profile in the slow-axis direction with a maximum value at the core center and a minimum value at the slow-axis edges such that the core functions as a positive graded index (GRIN) lens in the slow-axis direction, or a minimum value at the core center and a maximum value at the slow-axis edges such that the core functions as a negative graded index (GRIN) lens in the slow-axis direction.

Additional aspects of this embodiment include doping the core with an active laser ion that provides gain at a first optical wavelength. The active laser ion concentration may have a spatial profile in the slow-axis direction with a maximum concentration at the core center and a substantially lower concentration at the first and second slow-axis core edges. Alternately, the concentration may be substantially zero at the core edges. Further, the edge-cladding regions may be doped with an ion that is absorptive at the first optical wavelength. For example, the active ion may be Yb and the absorber doped into the edge-cladding regions may be Sm or Dy.

DETAILED DESCRIPTION

As used herein, "barbell geometry" is a term that pertains to the physical geometrical and material requirements of the finished fiber and the challenges that must be addressed to succeed in fabricating a fiber that accurately meets these requirements. Specific requirements include size and shapes of various features in the preform, mutual positions, fidelity, roundness and flatness of different elements of the structure, materials chosen to manufacture the structure, and mechanical characteristics for different components.

"Barbell structure" is a term that pertains to defining fiber-fabrication requirements that enable the finished fiber to perform a desired optical function or behavior. These requirements are specific to a particular system application, and include such elements pertaining to optical characteristics of the components, including refractive indexes, magnitude and spectral bandwidth for the gain, as well as others.

Embodiments of the present invention provide improved HARC and SHARC fiber architectures and manufacturing methods for fabricating HARC and SHARC fibers. In particular embodiments, an arbitrary index step between the core and cladding in the fast-axis direction is provided with a very small (less than about 100 ppm) index step in the slow-axis direction, which is consistent with the need to implement loss filtering.

Figure 1:
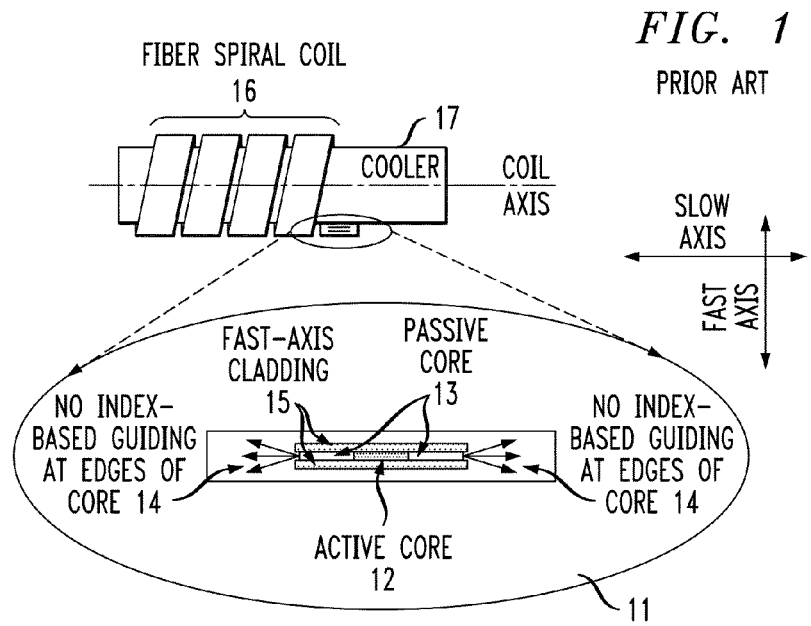
FIG. 1 is a schematic diagram of SHARC fiber wound in a spiral coil around a carrier and an expanded cross-section showing a prior art SHARC fiber architecture.
Figure 2:
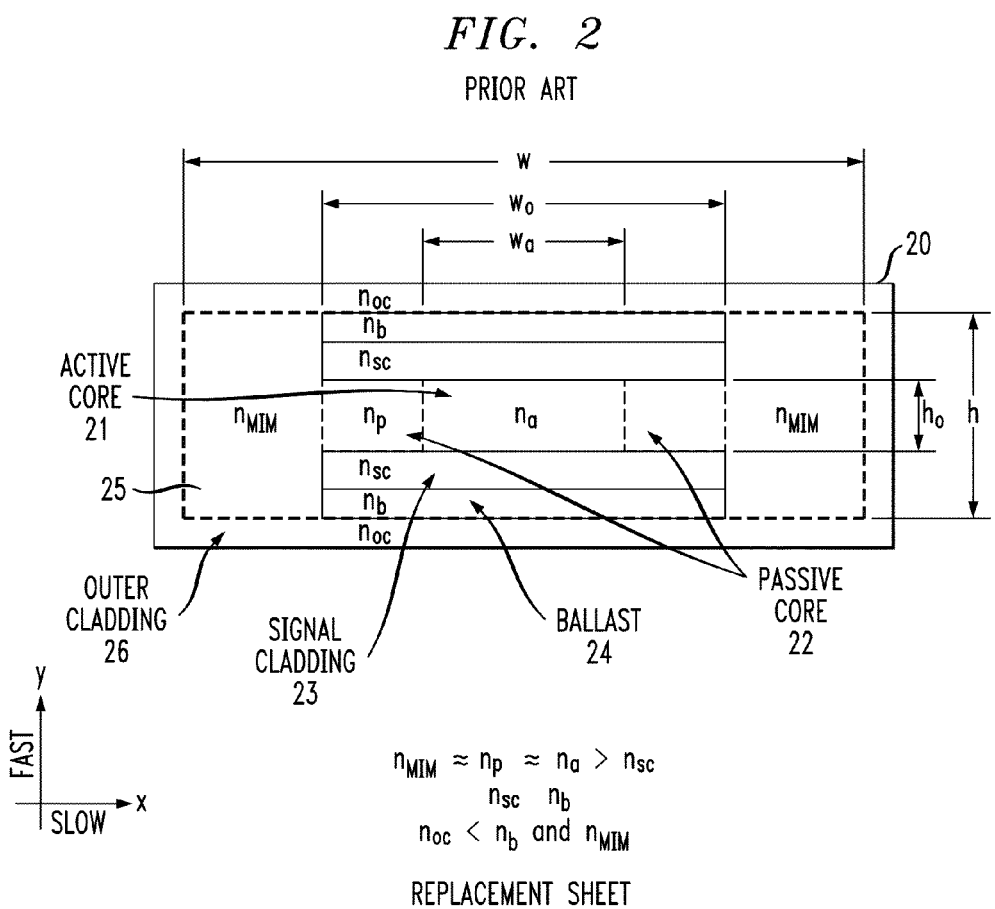
FIG. 2 shows a detailed cross section of the SHARC fiber architecture shown in FIG. 1.

Given the uniqueness of the slow-axis mode control employed in SHARC fibers, for example, of the type described with respect to the profile shown in FIG. 2, it is appropriate to describe how this affects the fiber design. Referring to the embodiment of FIG. 2, mode control can be obtained when the refractive index step across the slow-axis interfaces of the core is small (about 10 to 100 ppm). The refractive index $n_{MIM}$ of the mode-index matching (MIM) material at the edges of the core can be controlled by specifying the appropriate glass compositions and dopant concentrations in those sections of the fiber. It is useful to note that the effective index, $n_{mode}$, of any given mode is typically not either $n_a$ or $n_{sc}$, but lies somewhere between those limits. The reason for this is that the mode is formed by a collection of angular fast-axis components, and the electromagnetic fields that constitute the mode extend beyond the core into the lower-index signal cladding, and also possibly into the surrounding ballast material, which could also have a lower index. Hence, the objective of minimizing reflections at the edges of the core can be achieved, in a lowest order approximation, by designing the fiber such that $n_{MIM} \approx n_{mode}$. Thus, the material at the slow-axis edges does not actually function as "cladding;" it is chosen to lie in the middle between a neutral condition and slightly anti-guiding to eliminate trapping or reflecting the light in the core by the edges.

It is desired that the following two conditions should be fulfilled to reach the design goal of optically open edges: 1) the indices, $n_{sc} < n_{MIM} < n_{a,p}$, should all be different, and 2) the guided-mode index $n_{mode}$ should approximately match $n_{MIM}$, the index at the edges of the core. Detailed propagation studies indicate a reasonable tolerance on how well one must meet the requirement $n_{mode} \approx n_{MIM}$; in fact, loss filtering is found to be more effective when the edge interface is actually anti-guiding, i.e. when $n_{MIM}$ exceeds $n_{mode}$ by an amount $\sim 10^{-4}$ or more (100 ppm). It should be noted that the core will typically support more than a single mode and each mode will have a distinct $n_{mode}$. While in some exemplary applications it is important to maintain optically open edges for the propagating mode of the signal, which will typically be the lowest order fundamental mode, an optimal value of $n_{MIM}$ may be chosen as a compromise to inhibit trapping of more than this one mode.

Any suitable refractive index rib can be used for the ballast material immediately above and below the signal claddings. For example, the signal claddings can extend to the top and bottom surfaces of the inner cladding, which essentially corresponds to $n_b = n_{sc}$. Alternatively, the material for the ballast sections can be chosen to be the same as the material on the core edges, $n_b = n_{MIM}$. The index for the ballast sections can also be chosen to lie in between those values, or slightly beyond this range. A final choice becomes a matter of performance optimization, manufacturing convenience, and outer cladding requirements for pump guiding. The outer cladding may be used to guide the pump light and also to isolate the pump light from the external environment. In accordance with an aspect of the present invention, the refractive index of the outer cladding, $n_{oc}$, should be less than the refractive index of any material that constitutes the inner cladding.

The structure illustrated in FIG. 2 describes the conceptual design of a HARC or SHARC fiber. However, after much study and effort, it was determined that such a structure may be challenging from a fabrication perspective. The principal fabrication challenges arise from the complexity of the core and two signal claddings, which could be formed as a "three-layer sandwich" that is inserted into an appropriate slot in the inner cladding at the preform stage of fabrication. Tolerance build-up on the three layers is a significant challenge. Moreover, maintaining a uniform, flat interface between the core and the two claddings is also challenging because during the fiber draw process when the fiber is drawn from a larger preform, the nominally planar interface between the thin plates will be hard to control to be flat. If that interface is not flat, then the mode quality of the signal beam will suffer. What is needed is a fiber structure that meets the optical and propagation requirements outlined above, but that is much less challenging to fabricate.

An alternative architecture is described in US 2010/0189401 that meets the requirements outlined above. This alternative is shown schematically herein in FIG. 3. Fiber 30 is designed such that the propagating signal is confined roughly to the central portion of the slow-axis dimension. This is accomplished by fabricating the fiber such that the index-step, which creates the non-zero NA along the wide fast-axis boundaries of the core 31, is localized in the cladding region represented by the shaded portions 33 of the fiber cross-section. The narrow fast-axis active core 31 substantially being sandwiched between NA profiles 33 schematically indicates that a Yb dopant is localized to the region of highest NA, which is also where the propagating mode is expected to have the greatest amplitude and, therefore, the greatest efficiency of converting pump power absorbed by the Yb ions into useful output power.

Confining the NA in this manner offers, for example, three performance features. First, while the propagating mode will have a finite amplitude extending beyond the nominal width of the high-NA portion of the core, the design objective is that the amplitude be essentially zero at the core edges, thereby providing a situation in which any mechanical or optical imperfections at those edges will have essentially no impact on the propagation properties of that mode. Second, as is shown below, this modeling demonstrates that this structure offers a very high rate of loss filtering that effectively discriminates against higher-order slow-axis modes. Finally, the NA profile naturally produces a negative lensing effect in the wide (slow-axis) direction, and this fact offers the opportunity to compensate the slow-axis thermal lensing that will arise under high-power operation.

Figure 4:
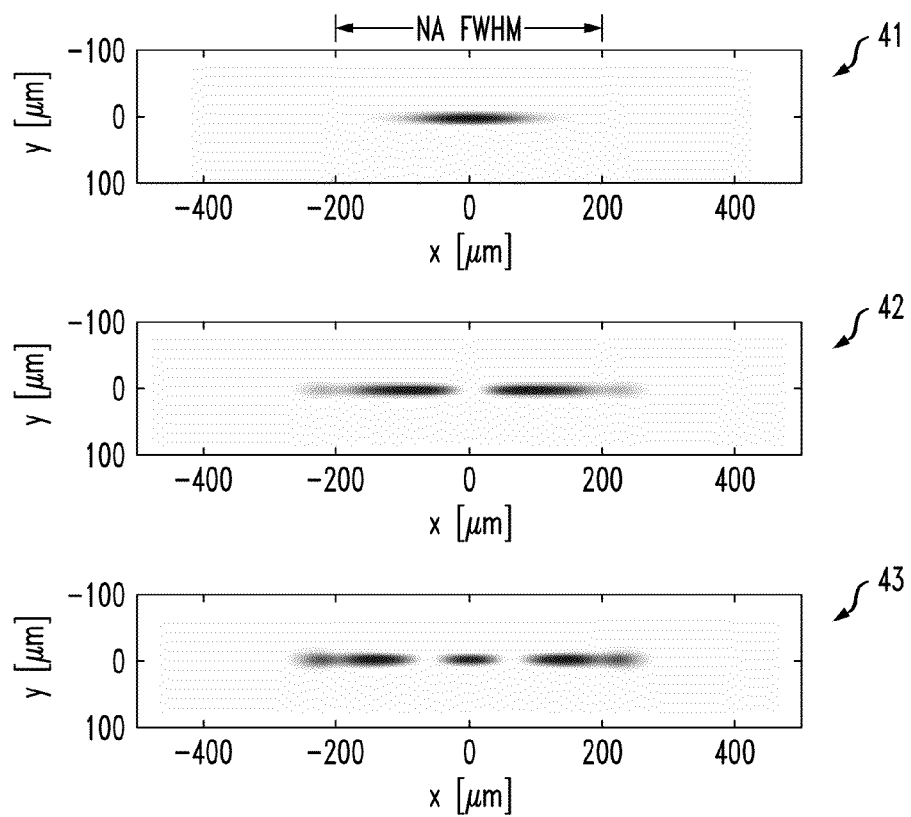
FIG. 4 illustrates intensity distributions of the first three optical propagation modes of the SHARC fiber design shown in FIG. 3.

Calculations have been performed with a Gaussian NA-profile having a maximum NA of 0.045 and a full width at half maximum (FWHM) of 400 µm. This NA profile is representative of what might be specified for a SHARC fiber, although much wider cores of 2 mm or more are also envisioned for SHARC fibers. These calculations show the desired properties (see FIG. 4 graphs 41, 42 and 43). FIG. 4 illustrates spatial profiles of the three lowest-order modes for a NA-profile SHARC fiber. The NA profile of the cladding perturbation is Gaussian along the direction of the slow axis; the double arrow at top of graph 41 represents a Gaussian FWHM of ~400 µm. Specifically, the lowest-order mode is clearly localized well within the region of the NA profile as shown in graph 41, while the next-higher order modes as shown in graphs 42 and 43 are clearly broader, extending beyond the localized NA step. The propagation losses for these three modes have also been quantified, and it was found that the ratios of loss rate coefficients to be 10:1 and 25:1 for the second and third modes, respectively, relative to the lowest-order mode. These loss ratios are certainly sufficient for effective loss filtering to ensure lowest-order mode propagation.

Figure 3:
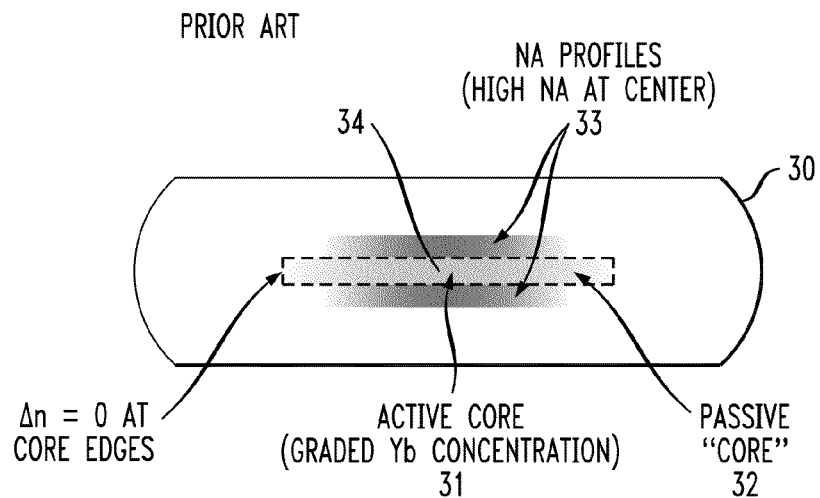
FIG. 3 illustrates a Numerical Aperture (NA) profile of a SHARC fiber in accordance with a prior art architecture.

From a fabrication perspective, the structure shown in FIG. 3 offers the advantage of a relaxed index-tailoring tolerance. Normally this tolerance can be rather tight, because the large slow-axis mode dimension imposes a relatively high sensitivity to small variations in the local core index. The relaxed tolerance possible with the structure arises from the fact that the controlled part of index is localized in the fast-axis cladding region, while the guided mode itself is concentrated mostly within the core, with only the weak tails penetrating into the fast-axis claddings. Under these conditions, for the same impact on the effective index of the propagating mode, the magnitude of the index change must be larger than if the index change were implemented in the core region. This increase provides the benefit of a corresponding relaxation of the absolute fabrication tolerance, for the same relative change in the effective mode index.

At least two primary approaches for achieving the desired index profile and the associated NA profile as discussed above have been considered. One approach involves down-doping the cladding regions just above and below the core, and imposing a slow-axis gradient in the doping concentration that yields the desired NA profile. This approach will use conventional dopants, such as fluorine, that are often used to reduce the index in fiber structures. Another approach for achieving the index profile is to generate holes running the length of the fiber as is typically done in photonic crystal fibers, and vary the hole density along the slow-axis direction. Either of these approaches can be used for fabricating a NA-profile SHARC fiber.

Regardless of how the NA-profile fiber is fabricated, it is believed that the fabrication challenges of the structure shown in FIG. 3 are similar to the ones related to the structure as illustrated in FIG. 2 because it shares the challenges associated either with the three-layer sandwich, or with the manufacture of a photonic crystal cladding preform. Hence, the key problem in both structures (FIG. 2 and FIG. 3) remains that these configurations, though desirable in optical properties, may be very challenging to fabricate.

One aspect of the invention pertains to a high aspect ratio fiber architecture, which can be semi-guiding. In one embodiment, the SHARC fiber has what will be referred to as a barbell profile. This barbell structure is relatively easy to fabricate, and also meets the optical propagation requirements summarized above. A second aspect of the invention, described further below, relates to methods of forming and manufacturing (S)HARC fibers.

Figure 5:
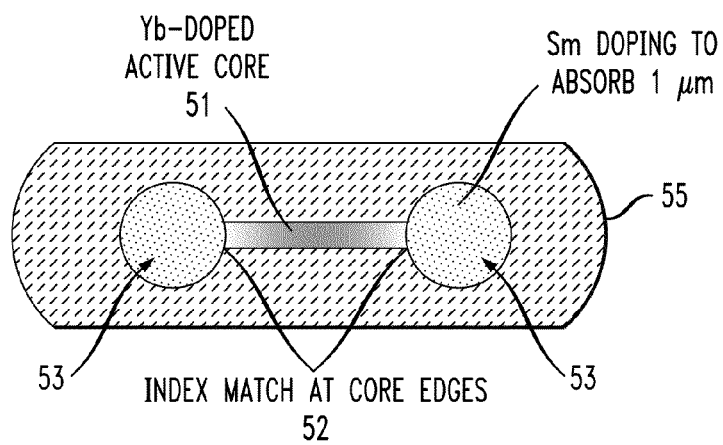
FIG. 5 illustrates a cross-section of a barbell-profile (S)HARC fiber in accordance with one or more embodiments of the present invention.

FIG. 5 illustrates a cross-section of an inventive (S)HARC fiber according to one embodiment having a barbell structure. FIG. 5 shows a core region including active core 51 and core edge regions 52. As shown in the figure, the core region formed by active core 51 and core edge regions 52 is substantially rectangular in cross-section. Adjacent to each core edge region 52 is an edge-cladding region 53. For HARC fibers, the refractive index of the edge-cladding region 53 can be designed to be a specific desired value within the limits established by the index of the inner cladding region 55 and the index of the core 51 at the edge region 52, depending on the specific application. For SHARC fibers, the refractive index of the edge-cladding region 53 can be designed to be a specific desired value within the limits established by the index of the core 51 at the edge region 52 and a value higher than that of the core-edge region 52 by an amount of approximately $1 \times 10^{-4}$ or greater, depending on the specific application. Although in FIG. 5, each of edge-cladding regions 53 is shown as a rod having a circular cross section, other cross-sectional shapes for the edge-cladding regions can be used, for example, a hexagonal, elliptical, a cyclic polygon shape or any other cross-sectional shape which might offer performance benefits, all of which will be referred to as a barbell shape. The two edge-cladding regions could also possess different refractive indexes to impact resonant coupling conditions between the core mode and the mode of the edge-cladding rods.

The core region and the edge-cladding regions are surrounded by inner cladding region 55. The overall cross section of the core region and edge-cladding regions 53 resembles a barbell in cross section and is thus referred to as a barbell structure. It is to be noted, however, that the use of the term barbell structure throughout the specification is for the ease of understanding only and does not require a cross section that literally resembles a barbell. Embodiments of the present invention can include other variations, for example, different shaped edge-cladding regions that are not circular, but for simplicity, are referred to as barbell structures. In accordance with some embodiments of the present invention, the barbell ends are not rectangular, but are curvilinear. For example, the barbell ends can be cylindrical, ellipsoid or any other curvilinear shape.

The exemplary barbell structure of FIG. 5 differs from the fiber shown in FIG. 2 in the following aspects. First, the structure is no longer a layered sandwich, but, instead, the core remains in direct contact with the inner cladding material that now serves also as the fast-axis cladding. Second, the portion of the cross-section dedicated to the edge-cladding material is formed by regions 53 adjacent to the core at each fast-axis edge. Third, the ballast layers are eliminated. This structure shares one of the features discussed earlier in connection with FIG. 3. Specifically, according to one embodiment, this barbell structure allows the option of implementing a graded Yb-concentration profile with a peak at the center of the core in the active core region 51, which would provide gain filtering in a (S)HARC fiber. According to this embodiment, the edge regions of the core would be substantially free of the Yb dopant in the active core region 51. Of course, a similar concentration gradient in the active core region 51 can be implemented with active ions other than Yb, including, for example, Er, Tm, Cr or others.

Each edge-cladding region 53 can comprise either a single rod adjacent to each fast-axis edge region 52 of the core, or a plurality of rods, also referred to as an array of rods. Such an array of rods can have inter-rod spacings, rod diameters, and rod index values optimized to produce resonance effects that preferentially pull higher-order modes out of the core. As noted above, for ease of description, the cross-section is still referred to as a barbell structure, regardless of the shapes or number of the different embodiments and is meant to be inclusive of any of these differently shaped embodiments.

Alternative embodiments of the invention include inserting a plurality of rods, instead of a single rod 252, 253 (see FIG. 12), into the side sections to ultimately become edge-cladding regions, filling the side sections with granules of a selected material composition, or filling the side sections with a combination of both granules and one or more rods. FIG. 13A illustrates a plurality of rods 300 that may be inserted in place of rods 252 and 253. FIG. 13B is a view of a (S)HARC fiber that is formed to include these plurality of rods at each slow-axis edge termination of near-rectangular core section 251.

Figure 13A:
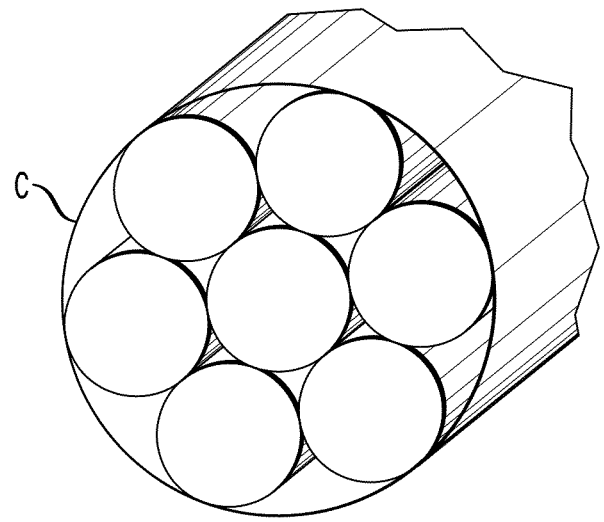
FIGS. 13A-D illustrate exemplary embodiments where an array of rods in a preform may be used to create a single rod in a fiber and where an array of rods in the fiber may be used as an edge-cladding region in accordance with the present invention.
Figure 13B:
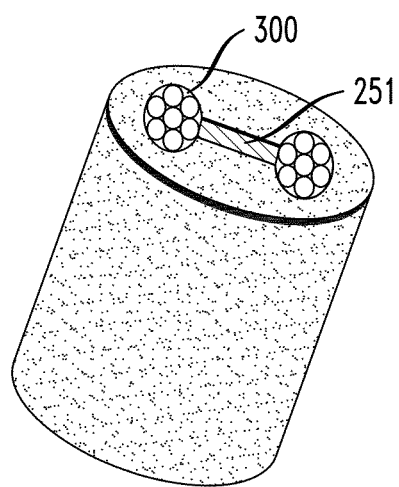
Figure 13C:
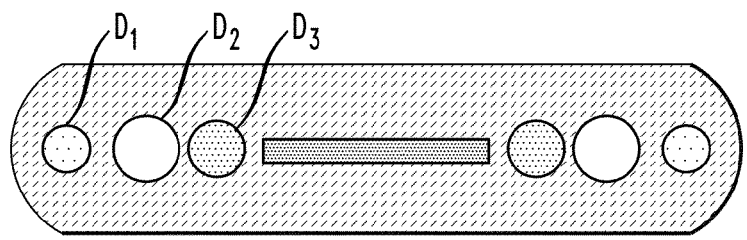
Figure 13D:
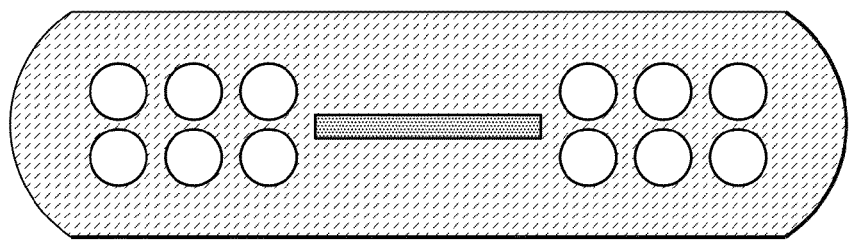

Another example of an array of rods is schematically shown in FIG. 13C. In this example, the fiber structure embodies a linear array of three rods. This figure shows a particular case where several of the design degrees of freedom are exercised: the rod diameters, $D_j$, and the inter-rod spacings vary within each array, and in addition the refractive-index values also vary, as indicated by the different degrees of shading in the individual rods in the array. FIG. 13D schematically shows another design degree of freedom: the use of a two-dimensional array in place of a single rod at the narrow core edges. This latter figure shows all rods having the same size, spacing, and index, but in combination with FIG. 13C, one skilled in the art will understand that a multi-dimensional array could also embody variations in the rod diameters, spacings, refractive indices, number of rods and number of rows, and other physical parameters enabled by this design.

Figure 6:
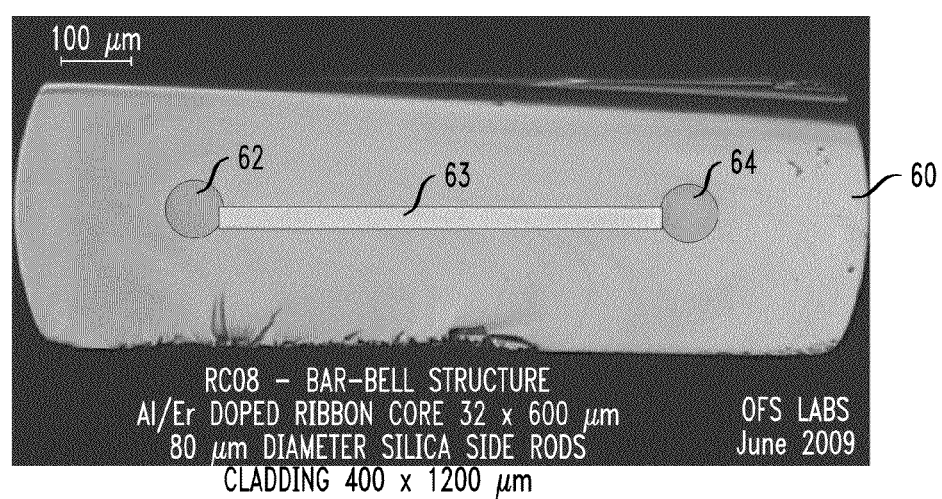
FIG. 6 illustrates a cross-section of a barbell profile of a HARC fiber fabrication process that is adapted to (S)HARC fabrication in accordance with one or more embodiments of the present invention.

A feature of the barbell structure shown in FIG. 5 is that it is relatively simple to fabricate. This is illustrated in FIG. 6 with an actual image of a cross-section of a fabricated Er-doped fiber having the barbell structure in accordance with an embodiment of the invention. This particular fiber has a HARC structure with a fully guiding high aspect ratio fiber core, but a SHARC fiber could be similarly fabricated. The rectangular core shown in FIG. 6 has dimensions of 32 µm by 600 µm and rectangular cladding 400 µm by 1200 µm. Thus, the core has an aspect ratio of approximately 20:1, the core area is 19,200 µm$^2$, and the fiber cladding has an aspect ratio of about 3:1.

In one embodiment of the present invention, an aspect ratio of the core is less than about 100:1. In another embodiment, the aspect ratio of the core is less than about 40:1. In other embodiments, the aspect ratio of the core is less than about 60:1 or 100:1 and more than 30:1, 20:1, 15:1 or 10:1. The overall dimensions of the core can be in the range of 5 to 30 µm or more in the fast-axis direction, depending on the signal wavelength and the desired number of guided modes, and up to 2 mm or more in the slow-axis direction. In this context, a "high" aspect ratio is when the core slow-axis dimension is at least 10 times larger than the fast-axis dimension.

In one embodiment, the fiber cladding has an aspect ratio of less than about 10:1. In other embodiments, the aspect ratio of the fiber cladding is less than about 5:1, or 3:1. In one embodiment, the long axis of a cross section of the fiber cladding is at least 1 mm, 1.5 mm or 2 mm or more.

The photo of FIG. 6 has limited contrast. The low contrast contours of the edge-cladding regions 62 and 64 and the core 63 surrounded by inner cladding region 60 in the image have been overlaid with indicating shapes to better illustrate the actual shape of the barbell profile in this particular example. The structure has fewer flat interfaces and sharp edges compared to prior art designs, and it employs conventional round glass rods to create the edge-cladding regions 62, 64 that are fabricated by well-established methods for fiber optic production. The object in the manufacture of the structure of FIG. 6 was to fabricate a HARC fiber, and the rods used to make the edge-cladding regions were index-matched to the inner cladding and not the core 63. For a SHARC fiber, the rod index is closely matched to that of the active core (with a tolerance, for example, of about $1 \times 10^{-4}$ or a tolerance based on calculations of effective mode indices), as discussed above. A benefit of this structure is that it is easier to fabricate this fiber, in which the rods have a specified refractive index difference relative to the core index, than to fabricate the prior art (S)HARC structures and their associated fabrication challenges.

There are other direct benefits of adding rods at the fast-axis edges of the high aspect ratio core. The rods help to reduce mechanical stresses created near the edges as the fiber is cooled down after drawing. Moreover, the rods help to maintain the desired rectangular shape of the core.

Referring back to FIG. 5, achieving approximate index-matching of the core region 51 and edge-cladding regions 53 at the core edge regions 52 may not be sufficient to ensure that this structure will yield good output beam quality. Approximate index matching can allow any optical power from the undesired higher-order slow-axis modes of the planar core to leak away from the core while the power in the lowest-order mode suffers negligible leakage loss. In this sense, this structure provides a means to "clean up" the radiation that remains within the core. In this embodiment, however, the refractive index of the core exceeds the refractive index of the surrounding inner cladding region 55 in order to provide fast-axis TIR light guiding. When the index in the edge-cladding regions 53 is designed to approximately match that of the core at least at the edge regions 52, TIR guiding will also occur where the edge-cladding regions 53 are in direct contact with the inner-cladding region 55, thereby trapping the light from the core inside the rods. Such trapped radiation will slowly accumulate within the edge-cladding regions 53 as the optical signal propagates along the fiber, and some of this trapped radiation could eventually return to the core through the longitudinal "slot" represented by the core-edge-cladding region interface. This return light is problematic, because it contaminates the desired lowest-order mode in the core, reducing both the beam quality and the efficiency. For this reason, one or more embodiments of the barbell design will include additional features to prevent the radiation in the edge-cladding regions 53 from returning to the core. The following features will accomplish this objective.

For fiber-amplifier applications, a high beam quality signal will be launched into the fiber core with a very good overlap with the fundamental mode of the (S)HARC core. By design, the fundamental mode experiences only minor radiative loss through the core edges into the edge-cladding regions. However, the portion of the launched power that does not couple to the fundamental mode seeds the higher-order modes, which experience significant radiative loss. This portion, which is the largest contributor to the power in the index-matching rods, can be minimized by proper input coupling, thereby also reducing the subsequent power backflow into the core. Hence, coupling light at the input with a high fidelity is one of the most effective ways to reach high output beam quality for a (S)HARC fiber.

For an ideal and straight fiber, the light bouncing between the core and edge-cladding regions does not, in general, result in a reduction in the beam quality. Indeed, after achieving a balance between the power leaking back and forth between the edge-cladding regions and the core, the portion of the propagating light associated with the fundamental mode does not decrease. The contaminating light is just redistributed between the higher modes of the core and of the edge-cladding regions as the light propagates downstream, without increasing in relative power. The final output beam can be cleaned up by filtering out this contaminating light at the output end of the fiber. However, any mode mixing that arises in a non-ideal and/or curved fiber can further compromise beam quality. Distortions of the fundamental mode in the (S)HARC core induced by uncompensated thermal lensing, core-shape imperfections, fiber deformations and inhomogeneous core materials, can couple optical power out of the fundamental mode into the higher-order modes of the core. Subsequent mode-mixing processes redistribute the optical power among the fundamental and all higher-order modes, including those residing in the side rods. Hence, maintaining a nearly ideal core quality and also optically compensating for mode distortions (e.g., thermal lensing) represent other tools for ensuring that the amplified output beam has a high beam quality.

The loss filtering mechanism discussed earlier mitigates the mode mixing effects by spatially separating high-quality light located in the core and low-quality light concentrated in the edge-cladding regions. The active region of the fiber is localized within the core, and thereby laser amplification is exclusively limited to the core light, while the low-quality light within the side rods does not experience gain. Hence, gain filtering strongly contributes to the beam quality improvement by adding gain discrimination in favor of the core light, which is typically the fundamental signal mode, and against edge-cladding region modes and any undesired higher-order core modes.

The loss- and gain-filtering features mentioned above can yield benefits for other (S)HARC fiber designs, as well as other multi-mode core fiber amplifiers. According to one or more embodiments, one or more of the following features are unique to the barbell structure of the (S)HARC core.

First, accumulation of poor quality light in the side edge-cladding regions occurs gradually as the signal propagates from the launch facet toward the exit fiber end. In fact, a finite propagation distance, or "transient length," is needed before the light in the edge-cladding regions accumulates to a level sufficient for noticeable leakage back into the core. If the fiber length can be made shorter than this transient length, the contaminating back-leakage has inadequate propagation distance to develop. The transient length depends on the specifics of the barbell geometry, and it is analyzed in a model discussed below.

Second, the diameter of the rod used to make the edge-cladding regions should be chosen to be as large as possible, consistent with requirements for preform quality and a successful fiber draw process. The larger the rod, the better "storage capacity" it has before back-leakage becomes noticeable. For the same accumulated power in the edge-cladding regions, a larger diameter rod generates a lower leakage-light intensity within the edge-cladding regions after a given propagation distance along the fiber. In addition, the larger the rod, the smaller the area occupied by the slot at the core-rod interface relative to the total surface area of the rod. For the same power accumulated within the edge-cladding regions, this reduces the rate of power return to the core. In one embodiment of the present invention, the diameter of the rod is larger than the height of the core. In another embodiment of the present invention, the diameter of the rod is at least twice as large as the height of the core. In yet another embodiment of the present invention, the diameter of the rod is almost or substantially the same as the thickness of the internal cladding of the (S)HARC fiber.

Third, the axis of the edge-cladding regions can be displaced, up or down, with respect to the middle plane of the core. Such displacement (which is evident in FIG. 6, especially region 62 compared to core 63) will tilt the leakage light reflected off the outer region wall so that it does not go directly back into the core. Instead, the photons will rattle many times within the edge-cladding region as skew rays before re-entering the core.

Fourth, the edge-cladding region material can be selected or made to weakly absorb radiation at the signal wavelength. The return leakage back into the core can be reduced if the signal absorption within the edge-cladding regions is sufficiently strong, because the "bad" light is not just extracted from the core, but it is also absorbed at a rate faster than the leakage rate back into the core. To this end, FIG. 5 suggests that the edge-cladding regions might be doped with Sm, a well-known absorber of the 1 μm radiation of Yb and Nd lasers, to prevent light leaking out into the edge-cladding regions from re-entering the core (other absorbers could be used with Er- or Tm-doped fibers). One of the trade-offs associated with this structure is the fact that the Sm may also absorb 975 nm Yb pump radiation (albeit with a lower absorption coefficient). Since the spectral details of the rare-earth dopants depend on the specific fiber composition, absorbers other than Sm may be considered. If the Sm pump absorption is problematic, one option is doping the edge-cladding regions with Dy, another strong absorber near 1 μm. Other means of removing light from the edge-cladding features may be used, such as forward or backward scattering, or coupling to other index structures.

Fifth, the leakage rate from the edge-cladding regions to the core can be reduced somewhat by selecting the refractive index of the edge-cladding regions to be slightly higher than the core refractive index by perhaps 100 ppm. This makes the edge-cladding regions slightly anti-guiding with respect to the core, which restrains the leakage rate back into the core while maintaining conditions that enable loss filtering to be quite effective.

Sixth, the properties of the edge-cladding regions can be chosen to match certain optical properties of the higher order modes propagating in the core. For example, the methodology described above for selecting $n_{mode} \approx n_{MIM}$ can be adopted for index matching the higher-order core modes to the modes of the edge-cladding regions: If the effective index of modes carried in the edge-cladding regions matches that of certain core modes, then those modes will efficiently couple to each other. This feature can be used to remove unwanted higher order modes from the core. If the effective index of the fundamental core mode does not match that of any edge-cladding region modes, then the core mode will more weakly couple to the edge-cladding regions and will remain well guided in the core. For present purposes, mode matching means the difference in effective indices between modes is $<10^{-4}$ and preferably $<10^{-5}$. This design aspect can be used to couple the higher order core modes either to single side-rod modes, to multiple side-rod modes, or to the modes of multiple discrete side rods. The effective index of the edge-cladding regions can be adjusted using material index, rod size and rod shape, or combinations thereof.

Seventh, we have already mentioned above that an array of rods, rather than just a single rod, can be located at each of the narrow core edges. This array offers a number of design degrees of freedom, such as the inter-rod spacings, rod diameters, and rod index values, which can be optimized to produce resonance effects that preferentially pull higher-order modes out of the core, or have other beneficial impacts on the mode propagation.

Figure 7:
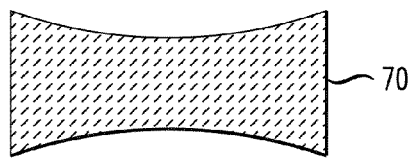
FIG. 7 illustrates a (S)HARC fiber core cross-section in accordance with an embodiment of the present invention.

It has been noted above that the NA-profile structure shown in FIG. 3 necessarily also functions as a planar graded index (GRIN) lens. For the NA-profile structure, the corresponding GRIN lens is defocusing, that is, it causes the light propagating in the core to diverge away from the fiber axis. Hence, this GRIN lens can be exploited to compensate a positive thermally induced focusing GRIN lens in a fiber laser or amplifier. Although the barbell structure does not inherently have that same GRIN lens property, nevertheless, the core can be shaped in such a manner so as to provide the same type of thermal lens compensation. Specifically, 3-D propagation studies show that shaping the core such that the interface between the core 70 and signal claddings as is schematically indicated in FIG. 7 produces a negative GRIN lens effect. For example, a core that is 20 μm thick and ~1 mm wide will be able to compensate a typical thermal lens by reducing the core thickness along the core axis by only about 5 μm. Such core shaping can be created using any of several methods. For example, if the structure is created by inserting a glass core slab into a cladding body containing a slot, the core slab could be machined to have a thinner midsection, or, if formed from porous glass, can have slightly higher porosity in the midsection. Alternatively, the core could be uniform while the cladding results in a thinner gap at the midsection, the thinner gap effectively causing core glass to flow to the sides during consolidation of the structure. A separate invention disclosure that specifically teaches how thermal lensing can be compensated by shaping the core, as well as by other variations of the fiber design, has been submitted as U.S. patent application Ser. No. 12/915,737, filed on 29 Oct. 2010 and is incorporated herein by reference in its entirety. The purpose for mentioning thermal lens compensation here is to point out that the barbell structure allows the above-mentioned compensation approach to be implemented if desired.

Verification by Modeling a Passive SHARC Fiber

A model has been developed as an aspect of the present invention that describes signal propagation through a passive barbell SHARC fiber having absorbing edge-cladding regions. Since the propagation is linear in this case, the problem of modeling loss in a barbell structure can be treated in a simplified kinetic-equations style. Such a simplified approach does not attempt to provide any details on the mode structures inside the core and the edge-cladding regions. Instead, it focuses only on power balance. This model uses the following notation: the power inside the core is denoted by $P_c(z)$, and the total power inside both side-edge-cladding regions is $P_r(z)$; a rate of out-coupling optical power from the core to the edge-cladding regions is denoted by $\beta[m^{-1}]$, while the back-coupling power flow from the edge-cladding regions to the core is denoted by $\gamma[m^{-1}]$; the bulk absorption rate inside the edge-cladding regions is given by an absorption coefficient $\alpha[m^{-1}]$.

Under these conditions, a pair of dynamic equations characterizes the propagation problem:

$$dP_c/dz = -\beta P_c + \gamma P_r, \quad dP_r/dz = \beta P_c - (\gamma + \alpha) P_r. \quad (1)$$

The power $P_c$ inside the core changes because of out-flow to the edge-cladding regions, at the rate $-\beta P_c$ and the in-flow $+\gamma P_r$ from the edge-cladding regions. The power $P_r$ in the edge-cladding regions (or rods) is increased by the in-flow $+\beta P_c$ from the core, but is lost due to the out-flow to the edge-cladding regions and also to absorption inside the edge-cladding regions at the common rate $-(\gamma + \alpha) P_r$.

The structure of Equations (1) assumes a self-similar propagation with an exponential drop of the power in both guiding channels, $P_{c,r}(z) = P_{c,r} \exp(-\mu z)$. The corresponding equation for the decay increment μ becomes $$\mu_\pm = (1/2)[(\alpha + \beta + \gamma) \pm \sqrt{(\alpha + \beta + \gamma)^2 - 4\alpha\gamma}] \quad (2)$$

Formally, two self-similar solutions exist for Equations (1). Each is characterized by a value for μ. For both solutions, light propagates so as to maintain a constant ratio of powers, $(P_r/P_c)$, in the side edge-cladding regions and in the core: $\mu_\pm \rightarrow (P_r/P_c)_\pm = (\beta - \mu_\pm)/\gamma = $ const. The solutions have physical meaning only if $\beta > \mu$, i.e., if both $P_c(z)$ and $P_r(z)$ are positive values.

The coupling rates β and γ should be evaluated independently, prior to solving Equations (1). They depend on the index difference between core and rod materials, on the barbell geometry, and also on the optical quality of the core edge.

One will end up with the following relation for leak rate for the k-th order slow-axis mode in the core of width w (where k=0 signifies the fundamental lowest-order core mode):

$$\beta_k = \zeta \cdot \frac{\Delta\theta^2}{w} \approx \zeta_{cr} \cdot (k+1)^2 \cdot (\lambda^2/n^2 w^3)$$

Two conclusions follow from this estimate. First, the radiation leak rate scales with mode index, k, as $(k+1)^2$. In addition, the rate scales with the core width, w, as $1/w^3$. The coefficient $\zeta_{cr}(\Delta n)$ depends on the index-matching accuracy Δn and on the edge geometry. One can evaluate this parameter by comparing results of direct computer simulations for a 450×15 μm² core having optimal index matching. In particular, at the leakage-loss peak, direct simulations give $\beta_0 \approx 0.4$ m$^{-1}$. One gets $\zeta_{cr}^{max} \approx \beta^0_{max}(w^3 n^2/\lambda^2) \approx 80$, accordingly. Similarly to the case above one gets $$\gamma_k \approx \zeta \cdot \frac{\Delta\theta^2}{d}\left(\frac{h}{\pi d}\right) \approx \zeta_{rc} \cdot (k+1)^2 \cdot \left(\frac{\lambda^2}{n^2 w^3}\right)\left(\frac{hw}{\pi d^2}\right) \approx \beta_k (A_{core}/A_{rod}).$$

Here $A_{core}$=hw is the area of the rectangular core, while $A_{rods}=2\cdot(\pi d^2/4)$ is the total cross section area of the two edge-cladding regions. It is shown that the back-leakage rate γ can be made less than the forward leak rate β by the ratio of the cross-sectional area of the core to that of the edge-cladding regions.

For a typical SHARC geometry having $A_{core} \approx 450 \times 15 = 6750$ μm² and the total area of both edge-cladding regions $A_{rods} \approx \pi(60)^2/2 \approx 5700$ μm², the rates $\beta_0 \approx \gamma_0 \approx 0.4$ m$^{-1}$ are nearly the same. A typical bulk absorption rate for <1% Sm doping is $\alpha \approx 4$ m$^{-1}$, which is much stronger than the coupling rates β and γ. For such a limit, the solutions for modes of Equation (2) can be simplified further. Only one of the modes, $\mu_-$, has a physical meaning giving positive values for powers in both the core and the edge-cladding regions.

$$\mu_- \approx \beta - \frac{\beta\gamma}{\alpha} = \beta \cdot (1 - \gamma/\alpha)$$

At this point, the model shows that the loss rate for this configuration is controlled mostly by the out-coupling rate, $\mu_- \approx \beta \ll \alpha$, but not the material absorption rate α. This is because, in this configuration, only a small portion of the power, $(P_b/P_c)_- = (\beta - \mu_-)/\gamma \approx \beta/\alpha \ll 1$, resides in the edge-cladding regions. Hence, most of the light propagates through the core, where no absorption is present.

Figure 8:
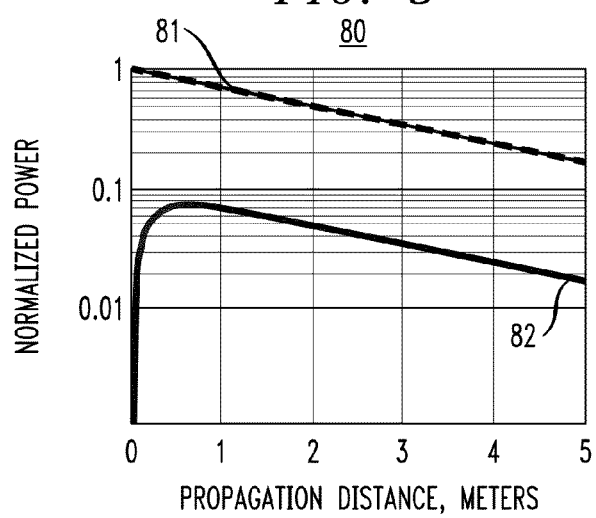
FIG. 8 shows normalized power inside the core (curve 81) and in the edge-cladding regions (curve 82) vs. propagation distance in meters for an exemplary SHARC barbell fiber supporting the propagation of a fundamental mode optical signal.
Figure 9:
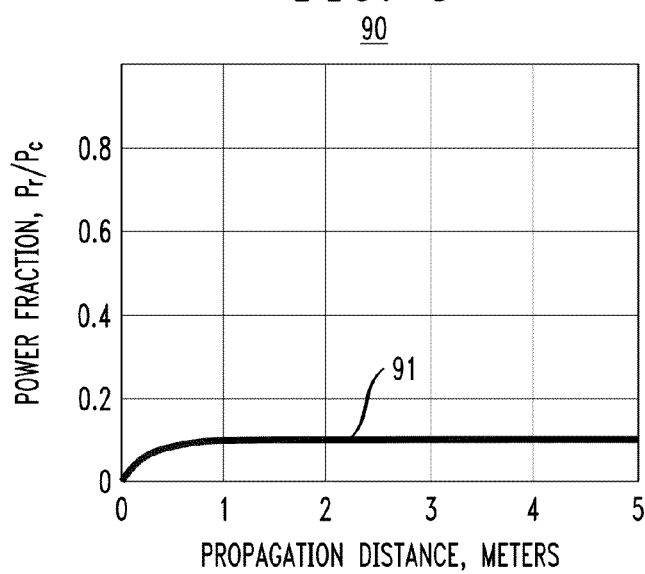
FIG. 9 shows the power portion in the edge-cladding regions for the same conditions as associated with FIG. 8.

The results of a direct digital solution of the Equations (1) are shown in FIGS. 8-11 for the example of a barbell SHARC fiber having w×h=450×15 μm² with rods of 60 μm diameter to form the edge-cladding regions, and for α=4 m$^{-1}$. FIGS. 8 and 9 illustrate the case of the lowest-order mode propagation, k=0, while FIGS. 10-11 correspond to coupling in the higher-order mode with k=2. The graphs 80 and 100 in FIGS. 8 and 10, respectively, demonstrate the evolution of the power in the core and in the index matching regions as a function of traveled distance. The graphs 90 and 110 in FIGS. 9 and 11, respectively, show the relative portion of the power residing inside the edge-cladding regions.

Figure 10:
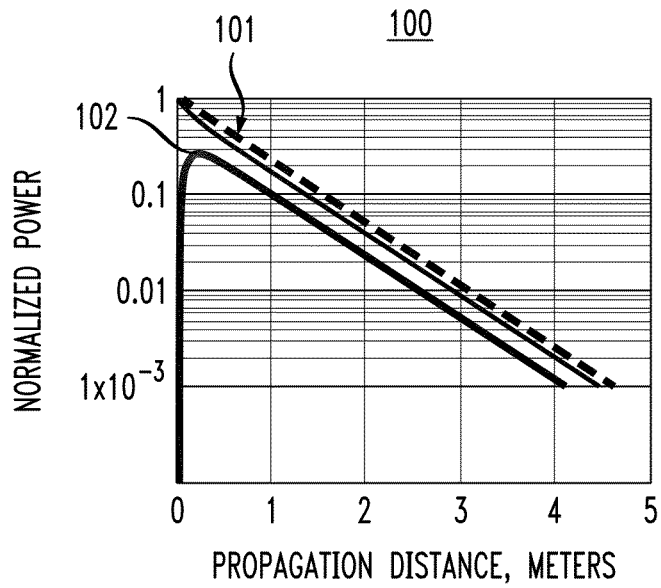
FIG. 10 shows the same dependencies as at the FIG. 8 for the same fiber but when a higher order mode (k=2) optical signal is coupled into the core.
Figure 11:
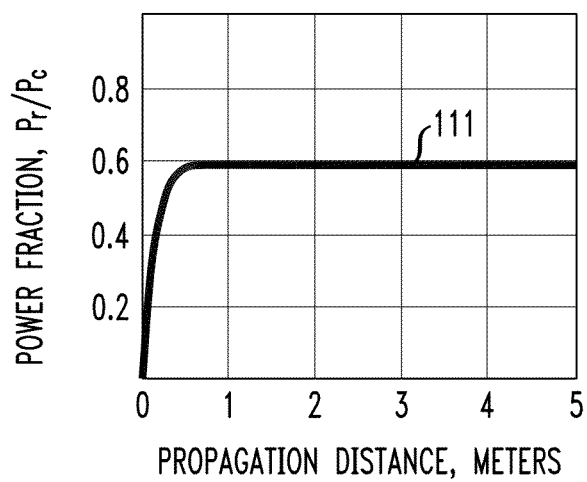
FIG. 11 shows the power portion in the edge-cladding regions for the conditions associated with FIG. 10.

FIG. 8 graph 80 shows normalized power inside the core (curve 81) and in the edge-cladding regions (curve 82) versus propagation distance (in meters) for the SHARC barbell fiber example if the lowest mode, k=0, is launched. FIG. 9 graph 90 by curve 91 shows the power portion in the edge-cladding regions, $P_r/P_c$, for the example SHARC barbell fiber if the lowest mode, k=0, is coupled in. FIG. 10 graph 100 shows normalized power inside the core (curve 101) and in the edge-cladding regions (curve 102) versus propagation distance (in meters) for the example SHARC barbell fiber if the higher-order mode, k=2, is coupled in. FIG. 11 graph 110 shows in curve 111 the power portion in the edge-cladding regions, $P_r/P_c$, for the example SHARC barbell fiber if the higher-order mode, k=2, is coupled in.

The simulation results are in a good agreement with the conclusions formulated above. It is seen in FIGS. 10 and 11 that the higher-order mode, which has a much stronger optical coupling with the edge-cladding regions, populates the edge-cladding regions rather quickly, after propagating just about half a meter, depositing up to 60% of its power in the edge-cladding regions. After passing this transient length, the power exchange process stabilizes, ending up with the asymptotic configuration with exponential decay, as found analytically above. The higher mode experiences very strong overall loss, about 0.2% transmission after passing 4 meters. According to FIGS. 8 and 9, the picture is significantly more favorable for the fundamental mode. After passing the transient length, stabilization at an exponentially decaying configuration is reached as well. However, the portion of optical power in the edge-cladding regions is much smaller, just about 10%, and the absorption rate for that case is much weaker, giving about 25% transmission after 4 meters of propagation. The parameters of the digital simulations are in very good agreement with the analytical results of Equation (3).

A fabricated SHARC fiber in one embodiment of the present invention has a length of at least 0.5 meters. A fabricated SHARC fiber in another embodiment has a length of at least 1 meter. A fabricated SHARC fiber in yet another embodiment could have a length of at least 25 meters, 50 meters, or more.

Embodiments of the present invention provide improved (S)HARC fiber architectures and manufacturing methods for fabricating (S)HARC fibers. In particular embodiments, an arbitrary index step is provided between the core and cladding in the fast-axis direction along with an index step in the slow-axis direction that can differ from the fast-axis index step and be greater than, equal to, or less than zero, depending on the intended application. The (S)HARC fiber core can either be passive (i.e., no amplification), or it can be doped with an ion such as Yb, Er, Tm, or several other laser ions to amplify light of a specific wavelength. A generic (S)HARC fiber looks schematically like the fiber in FIG. 5, and FIG. 6 is, in fact, a HARC fiber fabricated according to the process described below.

The simplest conceptual (S)HARC fiber application is as a passive delivery fiber, which efficiently propagates an optical beam from one point to another along the fiber that could follow a curved path. This passive beam delivery application can be met with a (S)HARC fiber as shown in FIG. 5 in which there is no Yb doping and the regions 53 are specified to match the refractive index of the cladding region. In this case, the core is uniformly surrounded by a lower-index medium along all four boundaries, and the NA is the same along all four boundaries.

Some applications will benefit from an NA in the slow-axis direction that differs from that in the fast-axis direction; the SHARC architecture is one example in which such an NA difference is desired. But other core structures for other applications involving multi-mode beams will benefit from a higher index step at the core edges than is optimal for a SHARC fiber. For example, a lower NA in the slow-axis direction can be used to control the number of slow-axis modes trapped inside the core. When an application is optimally met with a lower index-step in the slow-axis direction, the refractive index in the regions 53 can be designed to be a specific desired value within the limits established by the cladding index and the core index.

(S)HARC fibers are also useful as an amplifier or laser. Although the (S)HARC fiber slow-axis beam quality may be many times diffraction-limited, this does not preclude the use of an active (S)HARC fiber in applications that may not require very high beam quality single-mode beams.

Moreover, the HARC fiber beam quality can be improved by exploiting the same gain filtering approach that is schematically indicated in FIG. 5 for the SHARC fiber. As was discussed earlier, gain filtering is achieved by implementing a spatial concentration profile of the active laser ion (e.g., Yb, Er, or Tm) with a peak concentration at the center of the core in the active core region 51. In the HARC case, the gain filtering will allow the slow-axis beam quality to improve relative to the case of no gain filtering.

Another aspect of the invention pertains to a method of manufacturing an optical fiber, in particular, a (S)HARC fiber.

A (S)HARC fiber having a cross-sectional shape shown in FIG. 5 can be manufactured using near-net shape manufacturing techniques such as sol-gel processing or using conventional machining and grinding from bulk pieces of appropriately doped glass. As used herein, the terms "near-net shape" and "near-net shape part" refer to a shaped part that is close to its final, or net, shape, and does not need much machining in its finishing operation, and are equivalent terms and used interchangeably.

In one embodiment, a near-net shape is formed by first forming a porous silica soot blank. Methods of forming porous silica soot blanks are well known in the art and include, but are not limited to, vapor deposition technique such as outside vapor deposition (OVD), inside vapor deposition (IVD), vapor axial deposition (VAD), planar soot deposition (PSD), combinations thereof, and the like. These techniques typically involve passing a gas stream comprising a silicon-containing precursor compound through a flame generated by a combustion burner to form amorphous particles of silica soot, which are then deposited onto a support or substrate to form the silica soot blank. Candidate silicon-containing precursor compounds include, but are not limited to: halogen-containing compounds such as $SiCl_4$, $SiBr_4$, $SiF_4$, and the like; and halide-free cyclosiloxane compounds such as, for example, polymethylsiloxanes. Such polymethylsiloxanes include, but are not limited to, hexamethyldisiloxane, polymethylcyclosiloxane, octamethylcyclotetrasiloxane (OMCTS), decamethylcyclopentasiloxane, hexamethylcyclotrisiloxane, and combinations thereof.

In other embodiments, sol-gel colloidal or organic methods may be used to provide a porous shape or grain of silica particles. For example, a solution of at least one silicon-containing organic compound is first prepared. The silicon-containing compound has as a general formula of either Si(OR)4 or Si(OR)3, where R is an alkyl group. Non-limiting examples of suitable alkyl groups include: tetraethylorthosilicate (also referred to herein as "TEOS"); and tetramethylorthosilicate; methyltrimethoxysilane. In one embodiment, the solution is an aqueous solution comprising an acid, such as hydrochloric acid, formic acid, nitric acid, or the like, to act as a gelation catalyst. Organic solvents, such as ethanol or the like, may be added to improve miscibility.

The solution containing the silicon-containing organic compound is then gelled, which results in polymerization of the silicon and production of an alcohol, such as—in the case of TEOS—ethanol. Gelation times may be reduced by heating the solution or by neutralizing the solution pH by adding a second, basic solution. Once the gelation process is complete, the gel is dried to remove residual water and alcohol (and thus carbon). Either a near-net shaped porous body can be formed of the dried gel, or the gel can be fragmented into granules.

The soot blank, porous preform or granules are then consolidated or sintered to form a fused-silica near-net shape or boule from which the desired shape is ultimately machined. Consolidation is usually carried out in an inert atmosphere by heating the body at a temperature of up to about 1500° C. Prior to consolidation, excess water and hydroxyl (OH) groups may be optionally removed from the soot blank by means of a drying step. In the drying step, the blank is heated in the presence of a drying agent such as a halogen, a halogen-containing compound, carbon monoxide, or other such drying agents known in the art. The drying step is sometimes followed by an oxidation step in which the blank is heated in the presence of oxygen.

The fused silica boule may additionally be reformed or reshaped using methods that are known in the art, such as rolling, squashing, tilt flow, combinations thereof, and the like. A blank may then be cut from the reshaped or reworked fused silica boule and later shaped by means known in the art, including cutting, grinding, polishing, and the like to form the desired shape.

As will be appreciated with respect to FIG. 5, a substantially rectangular near-net shape to provide the core region 51 can be formed, and the core can be doped using known doping techniques to incorporate Yb or other suitable dopants. The doping profile can be suitably adjusted at the core edge regions 52 to provide index matching with the rods that form the edge-cladding regions 53. The edge-cladding regions 53 can be formed by providing fused silica rods that are appropriately doped with dopants such as Ge, Al, B, to provide the desired index of refraction, or a dopant such as Sm to provide the desired signal absorption, or a combination thereof to achieve the desired index and signal absorption. The solid glass rods may be formed by any suitable technique such as drawing from a larger-shaped boule, sol-gel casting, formation of near-net shape bodies, or other techniques. Alternatively, the edge-cladding regions 53 can be formed from porous glass bodies which are subsequently sintered, or from silica granules which are subsequently consolidated into solid glass. In both alternative cases, the glass can be suitably doped with known methods. The cladding 55 can be formed by providing a mostly rectangular near-net shape with internal voids, or by machining or grinding from an appropriate doped silica boule, or by consolidation of granules.

It is preferred that the outer boundaries of the cross-section of the fiber are rounded (as shown in FIGS. 5, 6, and 12A-D) to reduce the impact of minor twisting during draw, since such twisting can degrade the accuracy of shadow-based dimension control devices. Such rounded edges can be formed by machining flats or curved surfaces on a cylindrical shape or a near-net shape formed in a partially cylindrical container.

The core region of the fiber can be processed by drilling, etching, casting or other techniques to provide an appropriate receptacle for the rods, porous glass or granules that result in each of the edge-cladding regions 53. Alternatively, the cladding region can be manufactured as two separate pieces in a clamshell-type configuration, and each separate piece can be appropriately doped with respect to the core regions 51, 52 and machined or etched to provide space for the rods that form the edge-cladding regions. The rods can then be assembled into a first piece of the cladding and the two cladding pieces can be joined together. Thus, an aspect of the invention pertains to an improved process for forming near-net shapes for fiber preform fabrication that combine curved or circular and high aspect ratio rectangular features. In one aspect, a manufacturing process is provided that involves forming a rectangular or near-rectangular cladding region including a rectangular or near-rectangular core region. In one embodiment, the cladding region and core region each have a high aspect ratio, for example greater than 3:1. In one embodiment, the method includes forming an edge-cladding region adjacent to each fast-axis edge of the core region, and bounding the core region and edge-cladding regions with the cladding to provide a fiber preform having a barbell-shaped cross-section. In another embodiment, a fiber-quality silica glass body of multi-centimeter dimensions with high refractive-index homogeneity is provided by using sol-gel manufacturing techniques. Such bodies are not necessarily cylindrically symmetric and have widest dimension of 2 cm, and preferably >5 cm and more preferably >8 cm.

In one or more embodiments, the optical properties such as absorption, or gain, or the index profile within the core region and the index of refraction of the core and edge-cladding regions can be modified using solution doping techniques. In solution doping, a net shape or a boule can be immersed in a solution containing small amounts of dopant material, which is adsorbed into the pores of the boule or net shape. The boule or net shape is then dried, dehydrated, for example in chlorine at about 1000° C., to remove OH, and sintered to a solid preform. An alternative to solution doping is vapor doping by exposure of the boule or near-net shape to dopant vapor in a heated chamber, e.g., a chamber used for sintering.

Another doping alternative is sol-gel doping, in which the solution is formed of a sol-gel material. In sol-gel doping, polymerizable, glass-forming materials are used for forming at least one region of an optical fiber. An akyloxide sol-gel method can be used for forming the porous glass boule or for doping a glass boule, but the invention is limited to such methods. For example, a suitable material is readily formed, for the purposes of the invention, by preparing a colloidal sol and allowing the sol to polymerize, forming a colloidal gel. Alternatively, prior to polymerization, the sol can be suitably doped with desired ions (e.g., Er) and soaked into a porous glass boule. Aqueous alkali metal silicates mixed with colloidal silica or quaternary ammonium silicate are gelled with organic reagents such as formaldehyde, and subsequently leached in weakly acidic solutions. Again, prior to gelation, the liquids can be doped and soaked into a porous body. As a further example, aqueous silicates of, e.g., calcium, sodium, or aluminum may be coated, in solution, one a surface or soaked into a porous glass body and polymerized in situ, forming a gel by exposure to an acidic gas.

For sol-gel doping using alkoxide, a known method includes preparing a sol by dissolving a metal alkoxide (here called the host alkoxide) such as tetraethyl orthosilicate (TEOS) in a mixture of alcohol and water, and permitting the alkoxide to undergo hydrolysis and to begin subsequent polymerization. Dopant material, which may, for example, contain a glass modifier or a glass former, is dissolved along with the metal alkoxide. If the dopant material is, for example, a salt of a glass former, the dopant species are taken up substitutionally at metal sites in the resulting polymeric network. If the dopant material is, by contrast, a salt of a glass modifier, the dopant ions are incorporated at octahedral interstices in the polymeric network.

As one alternative to adding dopant material in the form of a salt, at least some dopant precursors are readily added in the form of alkoxides. The precursor alkoxides then react with the host alkoxide to form a polymer. This polymer is subsequently hydrolyzed and condensed to oxide glass as an associated complex.

In other embodiments, doping can be accomplished by molecular stuffing to alter the index of refraction or other optical properties of the glass. Molecular stuffing is described in U.S. Pat. No. 6,966,201, the entire content of which is incorporated herein by reference. Generally, molecular stuffing involves a glass body that starts as a porous material, such as a sol-gel body. The material is soaked in a liquid solution containing a dopant precursor, and dopant is precipitated into the pores of the sol-gel material. The glass body is then dried and sintered into solid glass. Alternatively, the doped material can be formed into granules.

According to a further aspect of the invention, a dopant is precipitated into the pores of the sol-gel material using an acid-base reaction that occurs as the dopants are diffusing, or after the dopants have been diffused, into a desired spatial distribution. Drying and sintering may be accomplished inside a high temperature furnace or inside a glass tube, which is heated to a suitably high temperature using a torch. High temperature processing tends to inhibit crystallization. As discussed above, the problem of crystallization has limited the type and amount of dopants that could be incorporated using conventional processes.

A process for doping high silica glass according to an aspect of the invention includes: (1) fabrication of a porous silica soot body using a conventional silica vapor-phase or colloidal sol-gel technique, (2) precipitation of dopant into the sol-gel body using a universal acid-base reaction, and (3) consolidation and collapse of the doped porous body in a furnace at high temperature. The process allows careful tailoring of dopant concentration distribution and eliminates crystallization. A further aspect of the invention is directed to managing shrinkage of the porous body so that a clear, monolithic body results. Yet a further aspect of the invention is directed to a process whereby granules of different composition are formed and then mixed in a fashion and consolidated to form a solid material with a spatial dopant gradient.

According to an embodiment of the invention, a (S)HARC fiber can be made using a molecular stuffing technique that uses alkoxide chemistry to grow nanoparticles (sol) inside porous structures, and the materials of the porous body acts as the reactive initiator.

Thus, one or more of the above techniques can be used to form a net shape, a preform or a boule, one of the net shapes being rectangular with a high aspect ratio (e.g., greater than about 3:1) and a curved net shape, and fabricating the net shapes into a barbell-shaped cross-sectional structure in which a rectangular or near-rectangular core section is bounded on its ends by two edge-cladding sections, and the core and edge-cladding sections are surrounded by cladding material. The various techniques described above can be used to tailor the refractive index of each of the core sections, the edge-cladding sections and the cladding as well as dopant ions to modify the absorption spectra and glass viscosities.

A specific embodiment of a manufacturing process will now be described with reference to FIGS. 12A-F to manufacture a structure having a cross-section in accordance with FIG. 5A. Suitable techniques for manufacturing using sol-gel techniques are described in U.S. Pat. Nos. 5,420,488 and 5,379,364, the entire content of each being incorporated by reference in its entirety.

U.S. Pat. Nos. 5,420,488 and 5,379,364 describe a procedure that being with preparation of a sol, which is an aqueous dispersion of silica particles. In exemplary procedures, stabilization of the sol is ascribed to electrostatic forces accompanied by high pH. A number of quaternary ammonium hydroxides are useful for such electrostatic stabilization. The negative surface charges produced on the colloidal particles provide mutual repulsion to result in stable aqueous sols having high concentrations of silica while avoiding both high viscosity and aggregation. Gelation is, in this instance, the consequence of deliberate charge balancing accompanied by pH reduction. Introduction of a positive charge, e.g., by adsorption of positive ions by the particles, dissipates the space charge and allows the silica particles to coalesce under the influence of, e.g., attractive van der Waals forces. A method of charge balancing which has resulted in acceptable tubes for overcladding on fiber preforms takes the form of pH reduction by addition of an appropriate ester, e.g. methyl formate, ethyl lactate, etc.

The procedure may be use of a sol of commercially-available silica particles. Conditions used in sol formation as well as in gelation affect the mechanical and chemical properties of the gelled body. From the standpoints of economics and qualified end product, it has therefore been found desirable to control the amount of added base. Inclusion of amounts of base in excess of that needed for desired pH results in increased silica dissolution. Satisfactory experimental results have entailed inclusion corresponding with dissolution of up to 50,000 ppm of silica. This process assures high yield of crack-free silica bodies (i.e., bodies largely consisting of silica). This process enables production of large (e.g., on the order of 1 kg) sol-gel bodies which are both crack-free and void-free at a level to assure desired properties of articles formed from such bodies—e.g., properties of optical fiber made from preforms including such bodies. A major finding of the invention depends upon increased yield due to inclusion of a polymer of a specified category, sometimes as supplemented by a low molecular weight additive. The latter, generally a polyhydric alcohol such as glycerin, is described as a "plasticizer," while the polymer is referred to as "binder." While this terminology is convenient, the function of these additives in the present case is, in some respects, different from that of conventional plasticizers or binders. Both aid in avoiding cracking during article fabrication, but serve only a temporary function. They are of such nature as to be expediently removed without functionally meaningful reside at a later stage. The combination of these additives has been found to significantly decrease the cracking of sol-gel bodies, particularly of large sol-gel bodies (~1 kg) by controlling the gel structure. Extensive experimentation has demonstrated synergistic behavior upon inclusion of both such additives. As discussed in U.S. Pat. Nos. 5,420,488 and 5,379,364, the amount of polymer is far below that required to form even a monolayer on the silica particles. Restriction of polymer inclusion to an amount that is much less than that needed for a traditional binder, provides for inter-particle bonding, while expediting removal and lessening residue from subsequent heating. The same restriction in included polymer amount plays a role in maintaining sufficient porosity of the resulting product to permit a suitable level of glass doping, as well as a suitable level of properties assuring structural integrity during subsequent processing and use.

Figure 12B:
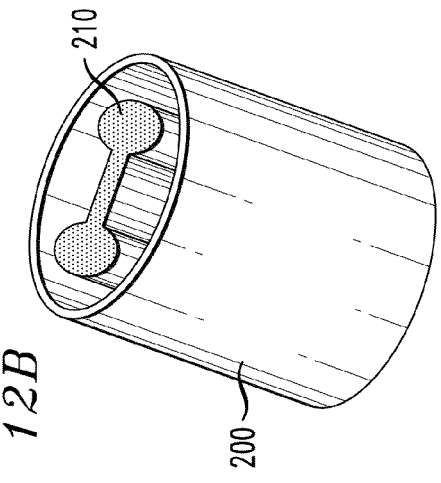
FIGS. 12A-12F schematically show an example of a manufacturing process that can be used in accordance with an embodiment of the present invention.
Figure 12D:
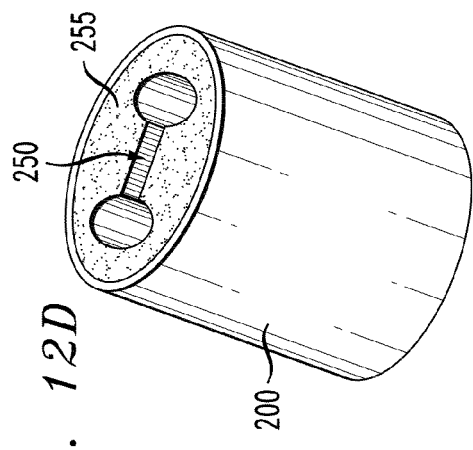
Figure 12A:
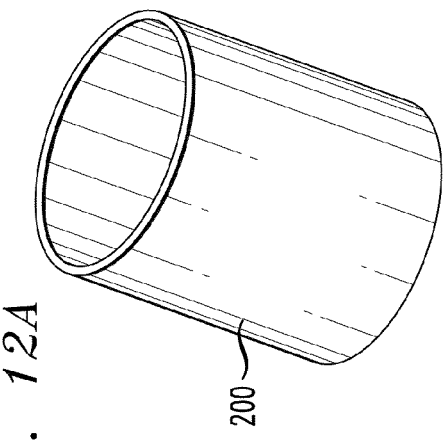
Figure 12C:
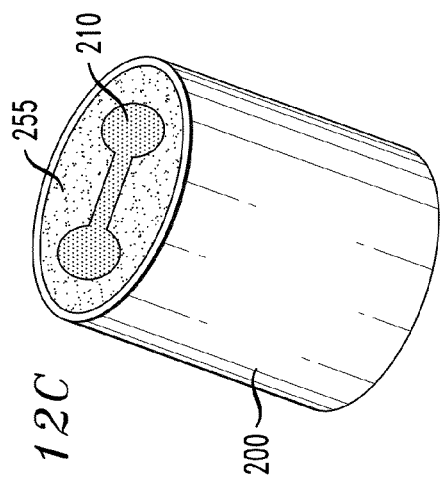
Figure 12E:
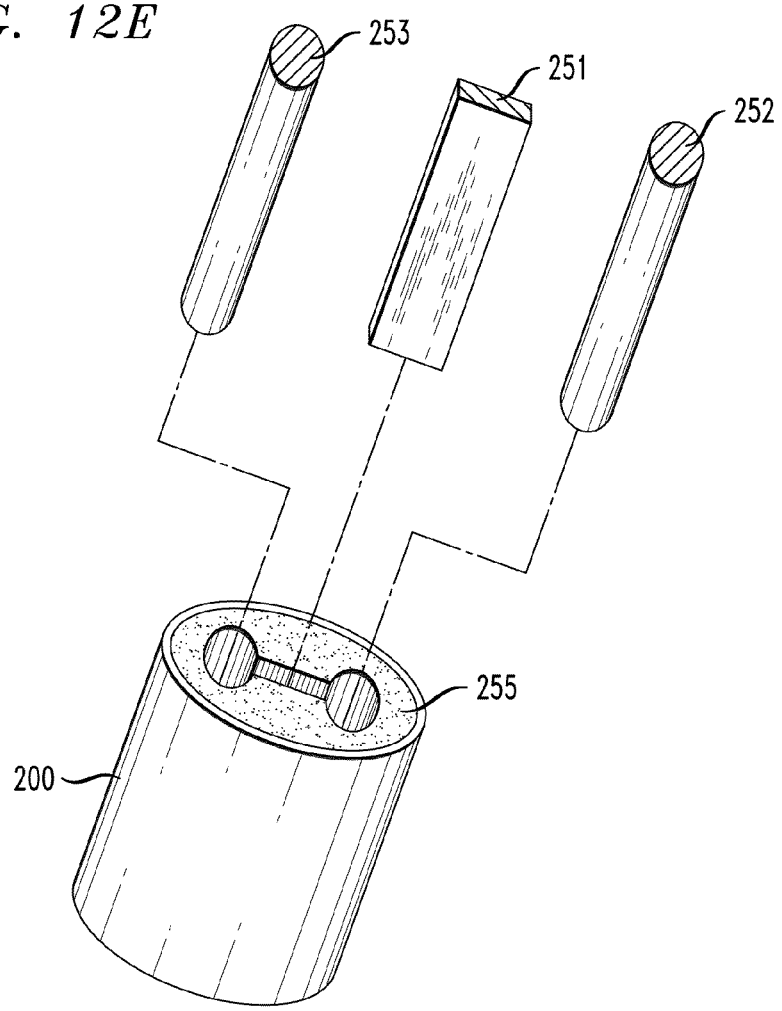

We now refer to FIGS. 12A-F. As shown in FIG. 12A, an outer mold 200 is provided, which may be in any suitable shape, but is shown as being cylindrical. An inner mold 210 is provided that can be unitary construction (a single piece), or it can comprise two or more separate parts. As will be appreciated with comparison to FIG. 5, the inner mold 210 inserted in the outer mold 200 provides a cross-sectional shape similar to the profile of the (S)HARC profile. Using sol-gel or other suitable techniques, cladding material intended to yield an appropriate index of refraction or other optical property is placed in the outer mold 200, but not in the inner mold 210. The inner mold 210 can be a solid component in accordance with an aspect of the present invention. Using the techniques described above, the material in the outer mold can be gelled as in FIG. 12C. The inner mold 210 can then be removed, and the body dried and appropriately treated to provide a cladding material 255, with a void 250 therein, as shown in FIG. 12D. Alternatively, the outer mold 200 can be filled with granules which are then consolidated to provide cladding material 255. Separately fabricated core section 251, which may be doped in accordance to provide a suitable index profile or other optical property, as described above, can be inserted in a center section of the void 250, and rods 252, 254 which may be doped in accordance to provide a suitable index profile or other dopant concentration as described above can be inserted in the side sections of the void 250 to provide a preform having a profile similar to the (S)HARC profile in FIG. 5.

Figure 12F:
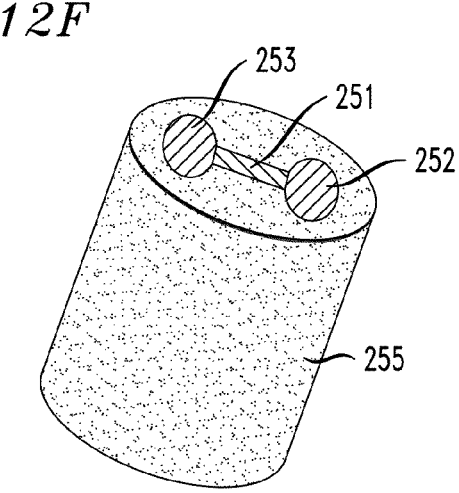

Cladding material 255 is typically removed from mold 200 after gelation and prior to drying. However, it may be advantageous to retain mold 200 in a wet state until void 250 is filled, as described above or filled with sols that are appropriately doped. Thereafter, the entire structure can be removed from the mold 200, creating a preform structure as shown in FIG. 12F. This preform can be further processed by drying, consolidation, and additional steps such as further doping, etc. The cladding 255 can be machined before or after consolidation to a solid body to provide an outer profile as shown in FIG. 5, or the mold 200 can have the appropriate interior shape to form the outer profile.

The outer cladding material 255 is assembled within the materials which ultimately become the edge-cladding regions and the core region to form an optical fiber preform. This preform is then drawn into fiber using known methods.

Figure 14:
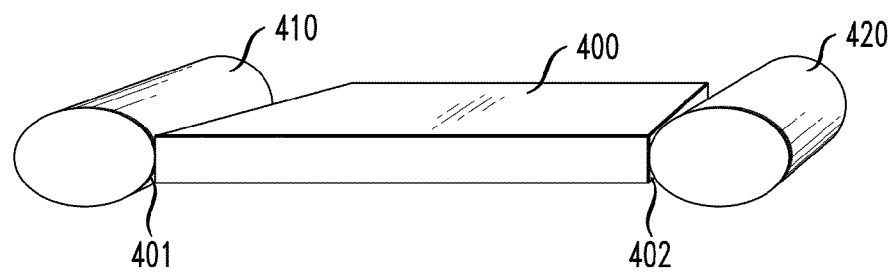
FIG. 14 illustrates an alternative barbell configuration for a (S)HARC fiber, in this case utilizing elliptically-shaped edge-cladding regions.

In another embodiment, as also described above, the edge-cladding regions may be formed to have a cross-section that is other than circular (e.g., elliptical, rectangular, or the like). FIG. 14 illustrates an exemplary barbell configuration for a high aspect ratio optical fiber that comprises a high aspect ratio core region 400 and a pair of elliptical edge-cladding regions 410, 420. As with the embodiments described above, elliptical edge-cladding regions 410 and 420 are disposed at opposing edges 401 and 402 of core region 400, where opposing edges 401 and 402 are defined as the fast-axis edge terminations. Elliptical edge-cladding regions 410 and 420 are positioned to physically contact edges 401 and 402, respectively. Although not particularly shown in this view, it is to be understood that the arrangement of FIG. 14 further includes a cladding region that surrounds the barbell configuration. The cladding region is formed of a composition with a refractive index that is less than the refractive index of any component of the barbell configuration in order for a propagating optical signal to remain confined within core region 400.

Moreover, either the core or edge-cladding regions of the configuration of FIG. 14 may be doped (including doping only a central portion of core region 400) as required for specific applications.

Figure 15:
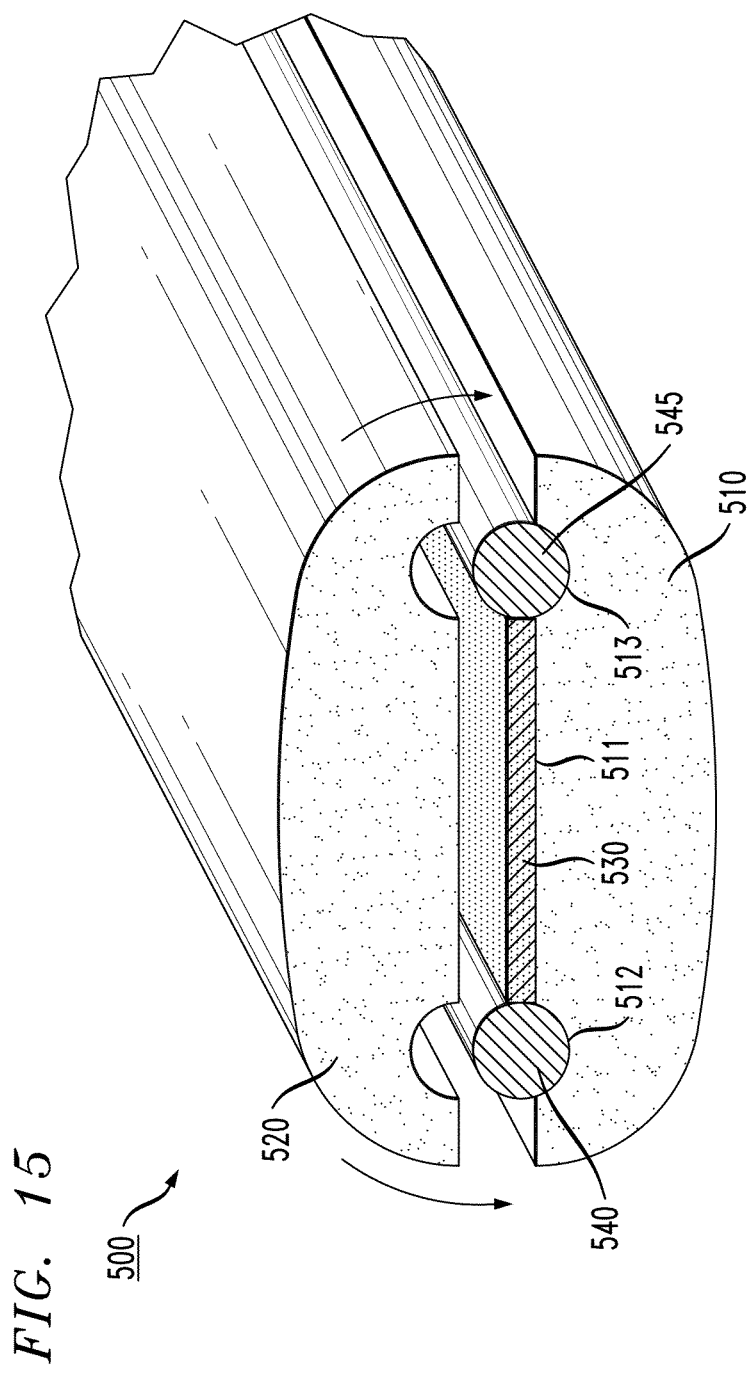
FIG. 15 shows an alternative fabrication arrangement of a (S)HARC fiber, using a two-piece clam shell arrangement.

FIG. 15 illustrates yet another arrangement that may be utilized in the fabrication of a high aspect ratio core optical fiber in accordance with the present invention. In this case, a "clam shell" structure 500 is shown as configured as a two-piece arrangement, shown as a first half 510 and a second half 520. Clam shell structure 500 is this case is used as a cladding region of a high aspect ratio optical fiber and, therefore, is formed of a first composition having an index of refraction appropriate for this function.

A near-net rectangular core region 530 is shown as disposed along a central longitudinal region 511 of first half 510, with a pair of rods 540, 545 disposed in semi-circular regions 512, 513 of first half 510. In accordance with the present invention, semi-circular openings 512, 513 are formed to abut either end termination of central region 511 in a manner such that rods 540, 545 will physically contact core region 530, creating the desired barbell configuration.

Once these elements are positioned, second half 520 of clam shell arrangement 500 is disposed over to encase the barbell configuration, where second half 520 includes the same central and semi-circular regions. Again, this particular method is considered exemplary only. Additionally, the particular structure of clam shell arrangement 500 is shown as exhibiting a flattened outer profile, which is desired in some situations, as discussed above, where the high aspect ratio fiber needs to be wound or otherwise bent during use.

While there have been shown, described and pointed out fundamental novel features of the invention as applied to preferred embodiments thereof, it will be understood that various omissions and substitutions and changes in the form and details of the methods and systems illustrated and in its operation may be made by those skilled in the art without departing from the spirit of the invention. It is the intention, therefore, to be limited only as indicated by the scope of the claims appended hereto.

What is claimed is:

1. A method of making a high aspect ratio core optical fiber preform, comprising:
    forming a near-net rectangular shape core region of a first composition and having an elongated cross-section with a wide slow-axis dimension and a narrow fast-axis direction;
    forming a pair of near-net shape cladding elements having a second composition;
    disposing the pair of near-net shape cladding elements adjacent to each slow-axis edge of the core region to form a pair of edge-cladding regions, the combination exhibiting a barbell configuration; and
    surrounding the combination of the near-net rectangular shape core region and the pair of near-net shape cladding elements with an outer cladding of a third composition.

2. The method of claim 1 wherein the second composition is different from the first composition.

3. The method of claim 1 wherein the second composition is the same as the first composition, forming a semi-guiding high aspect ratio core optical fiber preform.

4. The method of claim 1 wherein at least one of the pair of near-net shape cladding elements comprises a solid rod.

5. The method of claim 1 wherein at least one of the pair of near-net shape cladding elements comprises an array of rods.

6. The method of claim 1 wherein one or more of the near-net shapes are formed by one or more of the processing techniques including: sol-gel processing, outside vapor deposition (OVD), inside vapor deposition (IVD), vapor axial deposition (VAD), planar soot deposition (PSD), and combinations thereof.

7. The method of claim 1 wherein the composition of one or more of the near-net shapes may be achieved through a doping process comprising one or more of sol-gel doping, molecular stuffing, solution doping and vapor doping.

8. A fiber formed in accordance with the method of claim 1 by drawing down the high aspect ratio core optical fiber preform.

9. A method of making a high aspect ratio core optical fiber preform comprising:
- providing an outer mold;
- inserting an inner mold within an opening in the outer mold, the inner mold exhibiting a barbell configuration including a near-net rectangular shape having an elongated cross-section with a wide slow axis dimension and a narrow fast axis direction with a pair of near-net shapes adjacent to each fast axis edge of the near-net rectangular shape;
- placing cladding material of a first composition in open areas between the outer mold and the inner mold;
- removing the inner mold;
- inserting a near-net rectangular shape core region of a second composition, and having an elongated cross-section with a wide slow axis dimension and a narrow fast axis direction, in the opening created by removing the inner mold; and
- inserting a pair of near-net shape elements having a third composition at opposing end terminations of the slow-axis edges of the near-net rectangular shape core region, forming a pair of edge-cladding regions.

10. The method of claim 9 wherein the step of inserting a pair of near-net shape elements includes the step of inserting a pair of rods.

11. The method of claim 10 wherein the pair of rods comprise a pair of fused-silica rods.

12. The method as defined in claim 10 wherein the pair of rods exhibit a cross-section shape selected from the group consisting of: circular, elliptical and rectangular.

13. The method of claim 9 wherein the step of inserting a pair of near-net shape elements consists of:
- disposing porous glass in open areas between the cladding material and the near-net rectangular core region; and
- consolidating the porous glass to form a pair of edge-cladding regions.

14. The method of claim 9 wherein the step of inserting a pair of near-net shape elements consists of:
- disposing silica granules in open areas between the cladding material and the near-net rectangular core region; and
- consolidating the silica granules to form a pair of edge-cladding regions.

15. An optical fiber made according to the method of claim 9 by drawing down the high aspect ratio core optical fiber preform.

16. A method of making a high aspect ratio core optical fiber preform, comprising:
- providing a first half of a clam shell mold structure, the first half formed of a first composition and including central longitudinal region and opposing semi-circular regions extending longitudinally along either side thereof;
- disposing a near-net rectangular shape core region on the central longitudinal region, the near-net rectangular shape core region of a second composition and having an elongated cross-section with a wide slow axis dimension and a narrow fast axis direction;
- disposing a pair of near-net shape cladding elements of a third composition within each semi-circular region such that the near-net shape cladding elements contacts the near-net rectangular shape core region; and
- covering with a second half of the clam shell mold structure, the second half of the clam shell mold formed of the first composition and including semi-circular regions for encasing the pair of near-net shape cladding elements, the combination of the first and second halves of the clam shell mold forming a cladding region for the high aspect ratio core optical fiber preform.

17. An optical fiber formed in accordance with the method of claim 16 by drawing down the high aspect ratio core optical fiber preform.

18. A high aspect ratio core optical fiber exhibiting a barbell configuration comprising:
- a near-net rectangular shape core region of a first composition, the core region having an elongated cross-section with a wide slow axis dimension and a narrow fast axis direction;
- a pair of near-net shape cladding regions having a second composition, the pair of near-net shape cladding regions disposed adjacent to each fast axis edge of the core so as to contact the edges of the core region, the combination exhibiting a barbell configuration; and
- an outer cladding of a third composition disposed to surround the barbell configuration, the third composition being different from the first composition.

19. A high aspect ratio core optical fiber as defined in claim 18 wherein the near-net rectangular core region comprises silica.

20. A high aspect ratio core optical fiber as defined in claim 19 wherein at least a central portion of the core region is doped.

21. A high aspect ratio core optical fiber as defined in claim 19 wherein the core region is doped with an optical gain material selected from the group consisting of: Er, Yb, Tm.

22. A high aspect ratio core optical fiber as defined in claim 21 wherein the edge-cladding regions comprise a pair of glass rods.

23. A barbell-structure optical fiber, comprising:
- a high aspect ratio core region having an elongated cross-section with a wide slow-axis dimension and a narrow fast-axis dimension, wherein the core region has a substantially rectangular shape in cross-section including a width and a height defining an aspect ratio of width to height, the core region having an aspect ratio at least 10:1, and the core region having a first refractive index;
- an inner cladding region positioned in contact with and sandwiching the core region, the inner cladding having a second refractive index lower than the first refractive index;
- an outer cladding region arranged to surround the inner cladding, the outer cladding region having a third refractive index lower than the second refractive index; and
- a first edge-cladding region and a second edge-cladding region, the first edge-cladding region positioned adjacent to a first slow-axis edge region of the core region, the second edge-cladding region positioned adjacent to a second slow-axis edge region of the core region.

24. The fiber of claim 22 in which the refractive index of the first and second edge-cladding regions substantially matches the second refractive index of the inner cladding region.

25. The fiber of claim 22 in which the refractive index of the first and second edge-cladding regions has an intermediate value that is between the first refractive index of the core region and the second refractive index of the inner cladding region.

26. The fiber of claim 22 in which the core fast-axis dimension and numerical aperture (NA) are selected in such a manner that the core supports only a single transverse mode in the fast-axis direction.

27. The fiber of claim 22 in which the core fast-axis dimension and NA are selected in such a manner that the core supports multiple modes in the fast-axis direction.

28. The fiber of claim 22 wherein the difference between second and third refractive indices provides a NA of at least 0.45.

29. The optical fiber of claim 22, wherein the length of the fiber is less than a transient length at which the light leakage from the core to the edge-cladding regions accumulates to a level sufficient for noticeable leakage back into the core region.

30. The optical fiber of claim 22, wherein the edge-cladding region comprises a rod.

31. The optical fiber of claim 30, wherein the rod has a substantially circular cross-section.

32. The barbell optical fiber of claim 30, wherein the at least one of the first or second edge-cladding region comprises a plurality of rods.

33. The optical fiber of claim 30, wherein the rod has a diameter that is equal to or greater than the height of the core region.

34. The optical fiber of claim 30 wherein an axis of the rod is displaced with respect to a middle plane of the core.

35. The optical fiber of claim 30, wherein the rod is doped with a material that is absorbing for an optical signal.

36. The optical fiber of claim 22, wherein the core has a cross-sectional shape functioning as a graded index (GRIN) lens in the slow-axis direction.

37. The optical fiber of claim 22, wherein the core first refractive index has a spatial profile in the slow-axis direction with a maximum value at the core center and a minimum value at the slow-axis edges such that the core functions as a positive graded index (GRIN) lens in the slow-axis direction.

38. The optical fiber of claim 22, wherein the core first refractive index has a spatial profile in the slow-axis direction with a minimum value at the core center and a maximum value at the slow-axis edges such that the core functions as a negative graded index (GRIN) lens in the slow-axis direction.

39. The optical fiber of claim 22, wherein the core is doped with an active laser ion that provides gain at a first optical wavelength.

40. The optical fiber of claim 39 wherein the active laser ion concentration has a spatial profile in the slow-axis direction with a maximum concentration at the core center and substantially lower concentration at the first and second slow-axis core edges.

41. The optical fiber of claim 39 wherein the laser ion concentration is substantially zero at the first and second slow-axis core edges.

42. The fiber of claim 39, wherein the edge-cladding regions are doped with an ion that is absorptive at the first optical wavelength.

43. The optical fiber of claim 39, wherein the active ion is Yb and the absorber doped into the edge-cladding regions is Sm or Dy.

44. A barbell-structure optical fiber, comprising:
a high aspect ratio core region having an elongated cross-section with a wide slow-axis dimension and a narrow fast-axis dimension, wherein the core region has a substantially rectangular shape in cross-section including a width and a height defining an aspect ratio of width to height, the core region having an aspect ratio at least 10:1, and the core region having a first refractive index;
an inner cladding region positioned in contact with and sandwiching the core region, the inner cladding having a second refractive index lower than the first refractive index; and
a first edge-cladding region and a second edge-cladding region, the first edge-cladding region positioned adjacent to a first slow-axis edge region of the core region, the second edge-cladding region positioned adjacent to a second slow-axis edge region of the core region.

45. The fiber of claim 44 wherein first and second edge-cladding regions have a refractive index that substantially matches the refractive index of the core slow-axis edge regions so that any optical power from undesired higher-order slow-axis modes of the planar core leak away from the core while the power in the lowest-order mode suffers negligible leakage loss.

46. The fiber of claim 44 wherein first and second edge-cladding regions have a refractive index that provides anti-guiding at the slow-axis edges of the core.

47. The fiber of claim 44 wherein first and second edge-cladding regions have a refractive index that provides guiding at the slow-axis edges of the core.

48. The fiber of claim 44 wherein an outer cladding region is arranged to surround the inner cladding, the outer cladding region having a third refractive index and wherein the third refractive index is lower than the second refractive index.

49. The fiber of claim 44 wherein the difference between second and third refractive indices provides a NA of at least 0.45.

50. The fiber of claim 44 in which the core fast-axis dimension and NA are selected in such a manner that the core supports only a single transverse mode in the fast-axis direction.

51. The fiber of claim 44 in which the core fast-axis dimension and NA are selected in such a manner that the core supports multiple modes in the fast-axis direction.

52. The optical fiber of claim 44, wherein the length of the fiber is less than a transient length at which the light leakage from the core to the edge-cladding regions accumulates to a level sufficient for noticeable leakage back into the core region.

53. The optical fiber of claim 44, wherein the edge-cladding region comprises a rod.

54. The optical fiber of claim 53, wherein the refractive index of the rod differs from the refractive index of the core by less than 100 ppm.

55. The optical fiber of claim 53, wherein the rod has a substantially circular cross-section.

56. The barbell optical fiber of claim 44, wherein the at least one of the first or second edge-cladding region comprises a plurality of rods.

57. The optical fiber of claim 53, wherein the rod has a diameter that is equal to or greater than the height of the core region.

58. The optical fiber of claim 53 wherein an axis of the rod is displaced with respect to a middle plane of the core.

59. The optical fiber of claim 53, wherein the rod is doped with a material that is absorbing for an optical signal.

60. The optical fiber of claim 44, wherein the core has a cross-sectional shape functioning as a graded index (GRIN) lens in the slow-axis direction.

61. The optical fiber of claim 44, wherein the core first refractive index has a spatial profile in the slow-axis direction with a maximum value at the core center and a minimum value at the slow-axis edges such that the core functions as a positive graded index (GRIN) lens in the slow-axis direction.

62. The optical fiber of claim 44, wherein the core first refractive index has a spatial profile in the slow-axis direction with a minimum value at the core center and a maximum value at the slow-axis edges such that the core functions as a negative graded index (GRIN) lens in the slow-axis direction.

63. The optical fiber of claim 44, wherein the core is doped with an active laser ion that provides gain at a first optical wavelength.

64. The optical fiber of claim 63 wherein the active laser ion concentration has a spatial profile in the slow-axis direction with a maximum concentration at the core center and substantially lower concentration at the first and second slow-axis core edges.

65. The optical fiber of claim 64 wherein the active laser ion concentration is substantially zero at the first and second slow-axis core edges.

66. The fiber of claim 63, wherein the edge-cladding regions are doped with an ion that is absorptive at the first optical wavelength.

67. The optical fiber of claim 66, wherein the active ion is Yb and the absorber doped into the edge-cladding regions is Sm or Dy.

* * * * *